(12) United States Patent
Cockerille et al.

(10) Patent No.: US 8,556,698 B2
(45) Date of Patent: Oct. 15, 2013

(54) EXECUTING MULTIPLE APPLICATIONS AND THEIR VARIATIONS IN COMPUTING ENVIRONMENTS

(75) Inventors: Warner R. Cockerille, Sparks, NV (US); Richard E. Rowe, Las Vegas, NV (US)

(73) Assignee: IGT, Reno, NV (US)

( * ) Notice: Subject to any disclaimer, the term of this patent is extended or adjusted under 35 U.S.C. 154(b) by 1481 days.

(21) Appl. No.: 11/832,138

(22) Filed: Aug. 1, 2007

(65) Prior Publication Data
US 2007/0270212 A1 Nov. 22, 2007

Related U.S. Application Data

(63) Continuation-in-part of application No. 10/785,526, filed on Feb. 23, 2004, now abandoned, which is a continuation of application No. 09/746,944, filed on Dec. 21, 2000, now Pat. No. 6,645,077.

(60) Provisional application No. 60/242,046, filed on Oct. 19, 2000.

(51) Int. Cl.
*A63F 9/24* (2006.01)
*A63F 13/00* (2006.01)

(52) U.S. Cl.
USPC .................. 463/16; 463/20; 463/25; 463/29; 273/138.1; 273/138.2; 273/143 R

(58) Field of Classification Search
USPC ......................................... 463/16, 20, 25, 29
See application file for complete search history.

(56) References Cited

U.S. PATENT DOCUMENTS

| 4,335,809 A | 6/1982 | Wain |
| 4,339,798 A | 7/1982 | Hedges et al. |
| 4,467,424 A | 8/1984 | Hedges et al. |
| 4,558,413 A | 12/1985 | Schmidt et al. |
| 4,572,509 A | 2/1986 | Sitrick |

(Continued)

FOREIGN PATENT DOCUMENTS

| EP | 0 491585 | 6/1992 |
| EP | 0 689 325 | 12/1995 |

(Continued)

OTHER PUBLICATIONS

US Office Action dated Feb. 28, 2002 issued in U.S. Appl. No. 09/746,944.

(Continued)

*Primary Examiner* — Dmitry Suhol
*Assistant Examiner* — Ryan Hsu
(74) *Attorney, Agent, or Firm* — Foley & Lardner LLP

(57) ABSTRACT

Techniques for execution of multiple application programs and their variations are disclosed. One or more individual application program components that are determined to be already stored and/or loaded into memory are not loaded into memory again, thereby allowing the associated application program to be executed without unnecessarily reloading the one or more individual application program components into memory. Generally, by keeping track and/or predicting of the application components loaded into memory, it can be determined whether to load or unload a particular application program component. In addition, data that can readily identify the application components that are not already into memory can be provided as differential application data for loading various application programs and their variations to facilitate switching between and/or concurrently running multiple application programs and their variations.

31 Claims, 21 Drawing Sheets

(56) References Cited

U.S. PATENT DOCUMENTS

| | | |
|---|---|---|
| 4,614,342 A | 9/1986 | Takashima |
| 4,652,998 A | 3/1987 | Koza et al. |
| 4,760,527 A | 7/1988 | Sidley |
| 4,788,637 A | 11/1988 | Tamaru |
| 4,856,787 A | 8/1989 | Itkis |
| 5,019,963 A | 5/1991 | Alderon et al. |
| 5,136,644 A | 8/1992 | Audebert et al. |
| 5,155,837 A | 10/1992 | Liu et al. |
| 5,155,847 A | 10/1992 | Kirouac et al. |
| 5,326,104 A | 7/1994 | Pease et al. |
| 5,359,730 A | 10/1994 | Marron |
| 5,410,703 A | 4/1995 | Nilsson et al. |
| 5,421,009 A | 5/1995 | Platt |
| 5,421,017 A | 5/1995 | Scholz et al. |
| 5,472,194 A | 12/1995 | Breeding et al. |
| 5,473,772 A * | 12/1995 | Halliwell et al. ............. 717/171 |
| 5,555,418 A | 9/1996 | Nilsson et al. |
| 5,605,334 A | 2/1997 | McCrea, Jr. |
| 5,605,506 A | 2/1997 | Hoorn et al. |
| 5,618,232 A | 4/1997 | Martin |
| 5,643,086 A | 7/1997 | Alcorn et al. |
| 5,654,746 A | 8/1997 | McMullan, Jr. et al. |
| 5,655,961 A * | 8/1997 | Acres et al. .................... 463/27 |
| 5,675,754 A | 10/1997 | King et al. |
| 5,682,533 A | 10/1997 | Siljestroemer |
| 5,702,304 A | 12/1997 | Acres et al. |
| 5,702,552 A | 12/1997 | Vuong et al. |
| 5,715,462 A | 2/1998 | Iwamoto et al. |
| 5,724,425 A | 3/1998 | Chang et al. |
| 5,741,183 A | 4/1998 | Acres et al. |
| 5,742,829 A | 4/1998 | Davis et al. |
| 5,752,882 A | 5/1998 | Acres et al. |
| 5,759,102 A | 6/1998 | Pease et al. |
| 5,761,647 A | 6/1998 | Boushy |
| 5,762,552 A | 6/1998 | Vuong et al. |
| 5,768,382 A | 6/1998 | Schneier et al. |
| 5,770,533 A | 6/1998 | Franchi |
| 5,800,269 A | 9/1998 | Holch et al. |
| 5,809,251 A | 9/1998 | May et al. |
| 5,812,857 A | 9/1998 | Nelson et al. |
| 5,816,918 A | 10/1998 | Kelly et al. |
| 5,820,459 A | 10/1998 | Acres et al. |
| 5,836,817 A | 11/1998 | Acres et al. |
| 5,845,077 A | 12/1998 | Fawcett |
| 5,845,090 A | 12/1998 | Collins, III et al. |
| 5,848,064 A | 12/1998 | Cowan |
| 5,851,147 A | 12/1998 | Stupak et al. |
| 5,851,149 A | 12/1998 | Xidos et al. |
| 5,870,723 A | 2/1999 | Pare, Jr. et al. |
| 5,876,284 A | 3/1999 | Acres et al. |
| 5,885,158 A | 3/1999 | Torango et al. |
| 5,896,566 A | 4/1999 | Averbuch et al. |
| 5,905,523 A | 5/1999 | Woodfield et al. |
| 5,923,249 A | 7/1999 | Muir |
| 5,923,306 A | 7/1999 | Smith et al. |
| 5,923,885 A | 7/1999 | Johnson et al. |
| 5,941,947 A | 8/1999 | Brown et al. |
| 5,944,608 A | 8/1999 | Reed et al. |
| 5,951,639 A | 9/1999 | MacInnis |
| 5,970,143 A | 10/1999 | Schneier et al. |
| 5,974,454 A | 10/1999 | Apfel et al. |
| 5,980,384 A | 11/1999 | Barrie |
| 5,999,740 A | 12/1999 | Rowley |
| 6,006,034 A | 12/1999 | Heath et al. |
| 6,029,046 A | 2/2000 | Khan et al. |
| 6,047,128 A | 4/2000 | Zander |
| 6,047,129 A | 4/2000 | Frye |
| 6,061,660 A | 5/2000 | Eggleston et al. |
| 6,068,552 A | 5/2000 | Walker et al. |
| 6,074,435 A | 6/2000 | Rojestal |
| 6,077,163 A | 6/2000 | Walker et al. |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,135,887 A | 10/2000 | Pease et al. |
| 6,149,522 A | 11/2000 | Alcorn et al. |
| 6,154,878 A | 11/2000 | Saboff |
| 6,178,510 B1 | 1/2001 | O'Connor et al. |
| 6,203,430 B1 | 3/2001 | Walker et al. |
| 6,219,836 B1 | 4/2001 | Wells et al. |
| 6,254,483 B1 | 7/2001 | Acres |
| 6,263,497 B1 | 7/2001 | Maeda et al. |
| 6,264,561 B1 | 7/2001 | Saffari et al. |
| 6,266,810 B1 | 7/2001 | Tanaka et al. |
| 6,282,709 B1 | 8/2001 | Reha et al. |
| 6,317,827 B1 | 11/2001 | Cooper |
| 6,319,125 B1 | 11/2001 | Acres |
| 6,371,852 B1 | 4/2002 | Acres |
| 6,409,602 B1 | 6/2002 | Wiltshire et al. |
| 6,488,585 B1 | 12/2002 | Wells et al. |
| 6,508,710 B1 | 1/2003 | Paravia et al. |
| 6,634,946 B1 | 10/2003 | Bridgeman et al. |
| 6,645,077 B2 | 11/2003 | Rowe |
| 6,685,567 B2 | 2/2004 | Cockerille et al. |
| 6,712,693 B1 | 3/2004 | Hettinger |
| 6,716,102 B2 | 4/2004 | Whitten et al. |
| 6,805,634 B1 | 10/2004 | Wells et al. |
| 6,846,238 B2 | 1/2005 | Wells |
| 6,857,959 B1 | 2/2005 | Nguyen |
| 6,863,608 B1 | 3/2005 | LeMay et al. |
| 6,908,387 B2 | 6/2005 | Hedrick et al. |
| 6,939,226 B1 | 9/2005 | Joshi |
| 7,033,276 B2 | 4/2006 | Walker et al. |
| 7,040,987 B2 | 5/2006 | Walker et al. |
| 7,149,726 B1 | 12/2006 | Lingle et al. |
| 7,186,181 B2 | 3/2007 | Rowe |
| 7,379,901 B1 | 5/2008 | Philyaw |
| 2002/0071557 A1 | 6/2002 | Nguyen |
| 2002/0137217 A1 | 9/2002 | Rowe |
| 2002/0138594 A1 | 9/2002 | Rowe |
| 2002/0142825 A1 | 10/2002 | Lark et al. |
| 2002/0142846 A1 | 10/2002 | Paulsen |
| 2002/0151366 A1 | 10/2002 | Walker et al. |
| 2002/0188940 A1 | 12/2002 | Breckner et al. |
| 2003/0064771 A1 | 4/2003 | Morrow et al. |
| 2003/0188306 A1 | 10/2003 | Harris et al. |
| 2004/0002379 A1 * | 1/2004 | Parrott et al. ................... 463/29 |
| 2004/0048671 A1 | 3/2004 | Rowe |
| 2004/0127209 A1 | 7/2004 | Walker et al. |
| 2004/0127290 A1 | 7/2004 | Walker et al. |
| 2004/0147314 A1 | 7/2004 | LeMay et al. |
| 2004/0180721 A1 | 9/2004 | Rowe |
| 2005/0153776 A1 | 7/2005 | LeMay et al. |
| 2005/0176498 A1 | 8/2005 | Nguyen |
| 2005/0282638 A1 | 12/2005 | Rowe |
| 2006/0063575 A1 | 3/2006 | Gatto et al. |
| 2006/0121972 A1 | 6/2006 | Walker et al. |
| 2006/0189367 A1 | 8/2006 | Nguyen et al. |
| 2007/0032288 A1 | 2/2007 | Nelson et al. |
| 2007/0197298 A1 | 8/2007 | Rowe |
| 2008/0045346 A1 | 2/2008 | Nelson et al. |

FOREIGN PATENT DOCUMENTS

| | | |
|---|---|---|
| EP | 0 706 275 | 4/1996 |
| EP | 0 841 615 | 5/1998 |
| EP | 0 905 614 | 3/1999 |
| EP | 0 962 900 | 12/1999 |
| EP | 1 001 391 | 5/2000 |
| EP | 1 004 969 | 5/2000 |
| EP | 1 004 970 | 5/2000 |
| EP | 1 363 252 | 11/2003 |
| GB | 2 151 054 | 7/1985 |
| WO | 01/20424 | 3/2001 |
| WO | WO 02/32526 | 4/2002 |
| WO | WO 02/071726 | 9/2002 |
| WO | 03/019486 | 6/2003 |
| WO | WO 2005/022453 | 3/2005 |
| WO | WO 2006/096925 | 9/2006 |
| WO | WO 2007/008413 | 1/2007 |
| WO | WO 2008/045699 | 4/2008 |
| WO | WO 2009/018488 | 2/2009 |

(56) References Cited

FOREIGN PATENT DOCUMENTS

OTHER PUBLICATIONS

Supplemental US Office Action dated Mar. 12, 2002 issued in U.S. Appl. No. 09/746,944.
US Final Office Action dated Sep. 16, 2002 issued in U.S. Appl. No. 09/746,944.
US Office Action dated Jan. 31, 2003 issued in U.S. Appl. No. 09/746,944.
US Notice of Allowance dated Jun. 13, 2003 issued in U.S. Appl. No. 09/746,944.
Claims as allowed for U.S. Appl. No. 09/746,944.
US Office Action dated Dec. 11, 2008 issued in U.S. Appl. No. 10/785,526, 15 pgs.
US Final Office Action dated Aug. 19, 2009 issued in U.S. Appl. No. 10/785,526, 15 pgs.
US Final Office Action dated Feb. 4, 2010 issued in U.S. Appl. No. 10/785,526, 23 pp.
US Notice of Allowance and Allowed Claims, with Interview Summary and Examiner Amendment dated Apr. 2, 2008 issued in U.S. Appl. No. 10/659,827 19 pages.
US Office Action dated Aug. 7, 2008 issued in U.S. Appl. No. 10/659,827.
US Office Action—Notice NonCompliant Amendment, dated Jan. 15, 2009 issued in U.S. Appl. No. 10/659,827.
US Final Office Action dated May 27, 2009 issued in U.S. Appl. No. 10/659,827.
US Final Office Action dated Dec. 22, 2009 issued in U.S. Appl. No. 10/659,827.
US Examiner's Interview Summary dated Mar. 26, 2010 issued in U.S. Appl. No. 10/659,827.
US Advisory Action dated May 10, 2010 issued in U.S. Appl. No. 10/659,827.
US Office Action dated Jun. 30, 2009 issued in U.S. Appl. No. 11/176,833.
US Final Office Action dated Feb. 3, 2010 issued in U.S. Appl. No. 11/176,833, 31 pp.
US Office Action dated Oct. 28, 2010 issued in U.S. Appl. No. 11/176,833.
US Examiner's Interview Summary dated Feb. 3, 2011 issued in U.S. Appl. No. 11/176,833.
US Final Office Action dated May 13, 2011 issued in U.S. Appl. No. 11/176,833.
US Examiner's Interview Summary dated Sep. 1, 2011 issued in U.S. Appl. No. 11/176,833.
US Office Action dated Sep. 11, 2009 issued in U.S. Appl. No. 11/544,923.
US Final Office Action Jan. 27, 2010 issued in U.S. Appl. No. 11/544,923.
US Office Action Dec. 17, 2010 issued in U.S. Appl. No. 11/544,923.
US Final Office Action May 16, 2011 issued in U.S. Appl. No. 11/544,923.
US Examiner's Interview Summary dated Aug. 23, 2011 issued in U.S. Appl. No. 11/544,923.
US Office Action dated Sep. 15, 2009 issued in U.S. Appl. No. 11/829,789.
Notice of Allowance dated Sep. 13, 2006 issued in U.S. Appl. No. 09/965,524.
Claims as Allowed for U.S. Appl. No. 09/965,524.
US Office Action dated Nov. 30, 2009 issued in U.S. Appl. No. 11/709,981.
US Final Office Action dated Jun. 30, 2010 issued in U.S. Appl. No. 11/709,981.
PCT International Search Report or the Declaration dated Mar. 25, 2002 issued in PCT/US2001/32368.
PCT International Written Opinion dated Aug. 12, 2002 issued in PCT/US2001/32368 5 pages.
PCT International Preliminary Examination Report dated Dec. 2, 2002 issued in PCT/US2001/32368 4 pages.
AU Office Action dated Oct. 13, 2005 issued in 2002214603, 2 pages.
PCT Invitation to Pay and Partial Search Report dated Nov. 6, 2008 issued in PCT/US2008/071830.
PCT International Search Report and Written Opinion dated Apr. 20, 2009 issued in PCT/US2008/071830.
PCT International Preliminary Report on Patentability and Written Opinion dated Feb. 2, 2010 issued in PCT/US2008/071830.
PCT International Preliminary Report on Patentability and Written Opinion dated Jan. 17, 2008 issued in PCT/US2006/025089.
AU Office Action dated Nov. 8, 2010 issued in 2006269597.
AU Office Action dated Jun. 15, 2011 issued in 2006269597.
EP Examination Report dated Apr. 9, 2009 issued in 06 785 708.6.
PCT International Search Report and Written Opinion dated May 7, 2008 issued in PCT/US2007/079901.
PCT International Preliminary Report on Patentability and Written Opinion dated Apr. 7, 2009 issued in PCT/US2007/079901.
AU Office Action dated Jul. 19, 2011 issued in 2007307924.
Chinese Office Action dated Aug. 30, 2010 issued in CN Application No. 200780044186.9.
EP Office Action dated Aug. 26, 2009 issued in EP Application No. 07843492.5.
PCT International Search Report dated Feb. 24, 2003 issued in PCT/US2002/02431.
International Preliminary Examination Report dated Apr. 17, 2003 issued in PCT/US2002/02431.
Australian Office Action dated Jun. 24, 2008 issued in No. 2002255490.
Canadian First Office Action dated Jan. 6, 2005 issued in No. 2,435,750.
Canadian Second Office Action dated Jul. 19, 2007 issued in 2,435,750.
European Office Action dated May 9, 2006 issued in No. 02724890.5.
Internet Basics: 'How Information Travels Online', 'What Happens When You Go Online', 'Making the Online Connection' and 'How to Download Files', copyright 1996, 12 pages.
"Computer Networking," Wikipedia [online] [retrieved on Jul. 29, 2008] Retrieved from: http://en.wikipedia.org/wiki/Computer_networking, 14 pp.
U.S. Appl. No. 09/642,192, filed Aug. 18, 2000.
Spielo Gaming International, www.spielo.com, Dec. 6, 2000.
Oracle Corporation, www.oracle.com/collateral/ent_partioning_fo.pdf, Feb. 1999.
Hiroaki Higaki, "Group Communication Algorithm for Dynamically Updating in Distributed Systems", Copyright 1994 IEEE International Conference on Parallel and Distributed Systems 0-8186-6555-6/94, higaki@sdesun.slab.ntt.jp, pp. 56-62.
Steffen Hauptmann, et al., "On-Line Maintenance with On-the-fly Software Replacement", Copyright 1996 IEEE Proceedings, Third International Conference on Configurable Distributed Systems, 0/8186-7395-8/96, pp. 70-80.
Hiroaki Higaki, "Extended Group Communication Algorithm for Updating Distributed Programs", Copyright 1996, IEEE, International Conference on Parallel and Distributed Systems, 0-8186-7267-6/96, hig@takilab.k.dendai.ac.jp, 9 pages.
EP Search Report dated Aug. 26, 2005 for EP application No. 01983154.4, 4 pages.
Office Action dated Jun. 28, 2005 from U.S. Appl. No. 09/965,524.
International Search Report and Written Opinion from International application No. PCT/US2006/025089, mailed Nov. 2, 2006, 9 pages.
Final Office Action dated Feb. 13, 2006 from U.S. Appl. No. 09/965,524.
Examination Report from Corresponding EP application No. 01983154.4, dated Dec. 20, 2006, 6 pages.
US Non-Final Office Action dated Feb. 16, 2012 issued in U.S. Appl. No. 11/709,981.
Canadian Office Action dated Mar. 2, 2012 issued in CA 2,426,331.
Australian Examiner's report No. 3 dated Oct. 7, 2011 issued in 2006269597.

(56) References Cited

OTHER PUBLICATIONS

Australian Patent Examination Report No. 2 dated Jul. 3, 2012 issued in 2007307924.
Chinese Second Office Action dated Dec. 7, 2011 issued in CN Application No. 200780044186.9.
Chinese Third Office Action dated Jun. 19, 2012 issued in CN Application No. 200780044186.9.
Australian Examiner's first report dated Apr. 1, 2009 issued in No. 2008202926.
Canadian Office Action dated Mar. 9, 2010 issued in 2,435,750.

* cited by examiner

APPLICATION PROGRAM CONFIGURATIONS

| A | A1 | A2 | A3 | |
|---|----|----|----|---|
| B | B1 | B2 |    |   |
| C | C1 | C2 | C3 | C4 |

GENERAL APPLICATION MATRIX 230

232

|   | A | B | C |
|---|---|---|---|
| A | ✕ | +C1, +C2 -C3, -C4 |   |
| B | +C3, +C4 -C1, -C2 | ✕ |   |
| C |   |   | ✕ |

|    | A1 | A2 | A3 |
|----|----|----|----|
| A1 | ✕ | +Ca1, +Ca2 -Ca3, -Ca4 |   |
| A2 |   | ✕ |   |
| A3 |   |   | ✕ |

APPLICATION SPECIFIC MATRIX 234

238

|    | A1 | A2 | A3 | B1 | B2 | C1 | C2 | C3 | C4 |
|----|----|----|----|----|----|----|----|----|----|
| A1 |    |    |    |    |    |    |    |    |    |
| A2 |    |    |    |    |    |    |    |    |    |
| A3 |    |    |    |    | 240 |    |    |    |    |
| B1 |    |    |    |    |    |    |    |    |    |
| ⋮  |    |    |    |    |    |    |    |    |    |

Figure 2C

RESOURCE LIST FOR APPLICATION PROGRAM A1 242

| | | |
|---|---|---|
| C1 | | L |
| C2 | | L |
| C3a | | U |
| C4 | | L |
| C5 | | L |

LOAD/UNLOAD INDICATOR 244

Figure 2D

246　　COUNTER 248

| | |
|---|---|
| C1 | 1 |
| C2 | 1 |
| C3b | 0 |
| C4 | 1 |
| C5 | 1 |

Figure 2E

GLOBAL RESOURCE LIST 249

| | | |
|---|---|---|
| C1 | | L |
| C2 | | L |
| C3a | | U |
| C3b | | L |
| C3c | | U |

Figure 2F

|  | TO | | |
|---|---|---|---|
| FROM | PYT1 | PYT2 | PYT3 |
| PYT1 | | -AVV001.paytable<br>-AVV001.config<br>+AVV002.paytable<br>+AVV002.config | -AVV001.paytable<br>-AVV001.config<br>+AVV003.paytable<br>+AVV003.config<br>+AVV003.language |
| PYT2 | -AVV002.paytable<br>-AVV002.config<br>+AVV001.paytable<br>+AVV001.config | | -AVV002.config<br>+AVV003.paytable<br>+AVV003.config<br>+AVV003.language |
| PYT3 | -AVV003.paytable<br>-AVV003.config<br>-AVV003.language<br>+AVV001.paytable<br>+AVV001.config | -AVV003.paytable<br>-AVV003.config<br>-AVV003.language<br>+AVV002.paytable<br>+AVV002.config | |

Figure 2G

| PYT3 RESOURCE LIST | REFERENCE COUNT | LOADING INDICATOR |
|---|---|---|
| AVV003.paytable | 0 | U |
| AVV003.config | 0 | U |
| Game.sounds | 1 | L |
| Game.graphics | 1 | L |
| AVV003.language | 0 | U |

Figure 2H

EXECUTING MULTIPLE APPLICATIONS AND THEIR VARIATIONS IN COMPUTING ENVIRONMENTS

CROSS-REFERENCE TO RELATED APPLICATION

The present application is a continuation-in-part of and claims priority from U.S. patent application Ser. No. 10/785,526, filed Feb. 23, 2004, which is a continuation of and claims priority from U.S. patent application Ser. No. 09/746,944, filed Dec. 21, 2000, now U.S. Pat. No. 6,645,077, which claims further priority from U.S. Provisional Patent Application No. 60/242,046 by Rowe, filed Oct. 19, 2000, each of which is entitled "Gaming Terminal Data Repository and Information Distribution System," each of which is commonly assigned, and each of which is incorporated by reference herein in its entirety and for all purposes.

BACKGROUND OF THE INVENTION

In computer science and software engineering, the process by which a computer or virtual computer carries out the instructions of a computer program (or program) is referred to as "execution." The term "run" can be used almost synonymously as execution. A related meaning of both "to run" and "to execute" can refer to the act of starting a computer program.

Typically, execution of a computer program requires storing it into memory. The process or act of loading the computer program into memory for execution can be referred to as "loading." Loading can be accomplished by using a loading component (or "loader"). In a computer operating system, a loader can be a component that locates a given computer program (e.g., an application program, part of the operating system itself) from a storage device (e.g., hard disk) and loads it into main storage (e.g., Random Access Memory) for execution.

An application program can be comprised of many individual application program components. As such, those skilled in the art readily appreciate that execution of an application program could require loading many individual application components into memory for execution of the application program. Modern gaming environments provide an example of a computing environment where execution of a gaming application program (e.g., a game) can require loading many individual gaming application program components (or gaming components) into the memory of a gaming machine (unit or device) for execution to, for example, effectively provide a game (e.g., video poker game) to one or more individuals (players) for play in a gaming environment that may be subject to a number gaming regulations. To further elaborate, gaming machines are briefly discussed below.

Typically, a gaming machine utilizes a master controller to effectively control various combinations of devices that allow a player to play a game on the gaming machine and also encourage game play on the gaming machine. A game played on a gaming machine usually requires a player to input money or indicia of credit into the gaming machine, indicate a wager amount, and initiate playing a game of chance. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines the outcome of the game, presents the game outcome to the player and may dispense an award of some type depending on the outcome of the game. The operations described above may be carried out on the gaming machine when the gaming machine is operating as a "stand alone" unit and/or linked in a network of some type to a group of gaming machines.

As technology in the gaming industry progresses, more and more gaming services are being provided to gaming machines via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

Given the extended use of the modern gaming machines, improved techniques for execution of the gaming applications (or games) would be highly useful. More generally, improved techniques for execution of computer programs would be useful.

SUMMARY OF THE INVENTION

Broadly Speaking, the invention relates to techniques for execution of multiple application programs and their variations. In accordance with one aspect of the invention, one or more individual application program components (or application components) that are determined to be already stored and/or loaded into memory are not loaded into memory again, thereby allowing the associated application program to be executed without unnecessarily reloading the one or more individual application program components into memory. Generally, by keeping track and/or predicting of the application components loaded into memory, it can be determined whether to load or unload a particular application component. In addition, it will be appreciated that data that can readily identify the application components that are not already into memory can be provided as differential application data for various application programs.

In one embodiment, differential application data is provided to effectively identify one or more individual application program components that need to be loaded (i.e., application components that are not already loaded into memory) so that they can be individually loaded instead of loading the entire application program into memory including the application components that are already stored in the memory. Typically, the common application components need not be reloaded and are consequently available for execution. These common components can be stored and/or loaded in the memory, for example, as result of loading and/or execution of one or more other application programs or previous loading and/or execution of the same application program and/or its variation.

The differential application data can, for example, effectively identify one or more individual application program components that need to be loaded in order to execute an application program. It will be appreciated that the one or more individual application program components identified by the differential application data can represent a subset of the components needed for execution of the application program. By way of example, the differential application data can effectively identify only a first component of the application program for loading even though the application program requires several other components. Generally, differential application data can effectively define the difference between a plurality of application programs (and/or variations of essentially the same application program) with respect to their individual application program components. As such, the differential application data can, for example, be provided as a matrix for two or more application programs (e.g., 2×2 matrix for two application programs, dimensional 3×3 matrix for three application programs).

In accordance with another aspect of the invention, individual components of two or more application programs are effectively compared to determine a loading strategy that would avoid unnecessarily loading and/or unloading of the common components when the application programs are executed. Generally, the application programs can be executed concurrently and/or sequentially. It will be appreciated that the application programs can be compared during the execution time to determine whether they have a common application component. In addition, differential application data the effectively defines the difference between the application programs with respect to their individual components can be generated, stored and subsequently used to enhance performance.

In accordance yet another aspect of the invention, multiple application programs and/or variations of essentially the same application program can be executed based on the differential application data that effectively describes loading instructions depending on the application programs that have been executed and/or currently executing. In one embodiment, differential application data associated with a first application program to be executed is obtained. The differential application data includes loading instructions based on the one or more other application programs that been executed and/or currently executing. Again, it should be noted that the one or more other application programs can be variations of the essentially the same application program or entirely different application programs. By way of example, the differential application data for the first application program can effectively identify one or more application components to be loaded in memory for the first application program when second and/or third application programs have been previously executed and/or are to be executed concurrently with the first application program. As another example, the differential application data for the first application program can effectively identify one or more application program components to be loaded in memory for execution of the first application program when the first application is to be executed instead and/or concurrently with a fourth application program, and so on. As such, differential application data can be provided as data readily available to accommodate the need to quickly change between several application programs and/or their variations what is provided.

The invention can be implemented in numerous ways, including a method, an apparatus, a computer readable medium, a computing device, or a signal embodied in a carrier wave. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2B depicts differential application data provided for a number of application programs in accordance with one embodiment of the invention.

FIG. 2C depicts differential application data provided as an application specific matrix for an application program in accordance with another embodiment of the invention.

FIG. 2D depicts differential application data in accordance with still another embodiment of the invention.

FIG. 2E depicts differential application data in accordance with one more embodiment of the invention.

FIG. 2F depicts differential application data in accordance with one more embodiment of the invention.

FIG. 2G depicts differential application data provided for a gaming environment.

FIG. 2H depicts differential application data as a resource list for a pay table in accordance with one embodiment of the invention.

DETAILED DESCRIPTION OF THE INVENTION

Figure 1A:
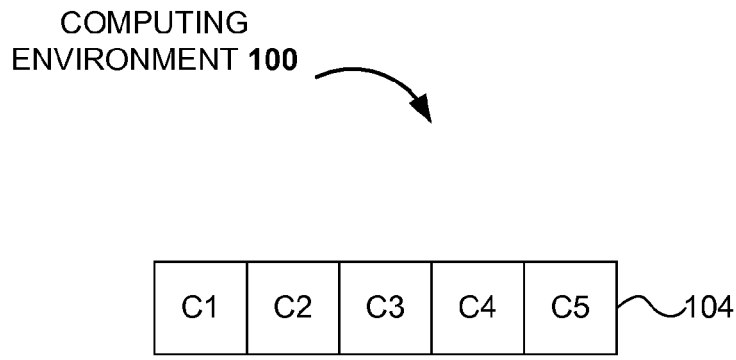
FIG. 1A depicts a computing system in a computing environment in accordance with one embodiment of the invention.
Figure 1A:
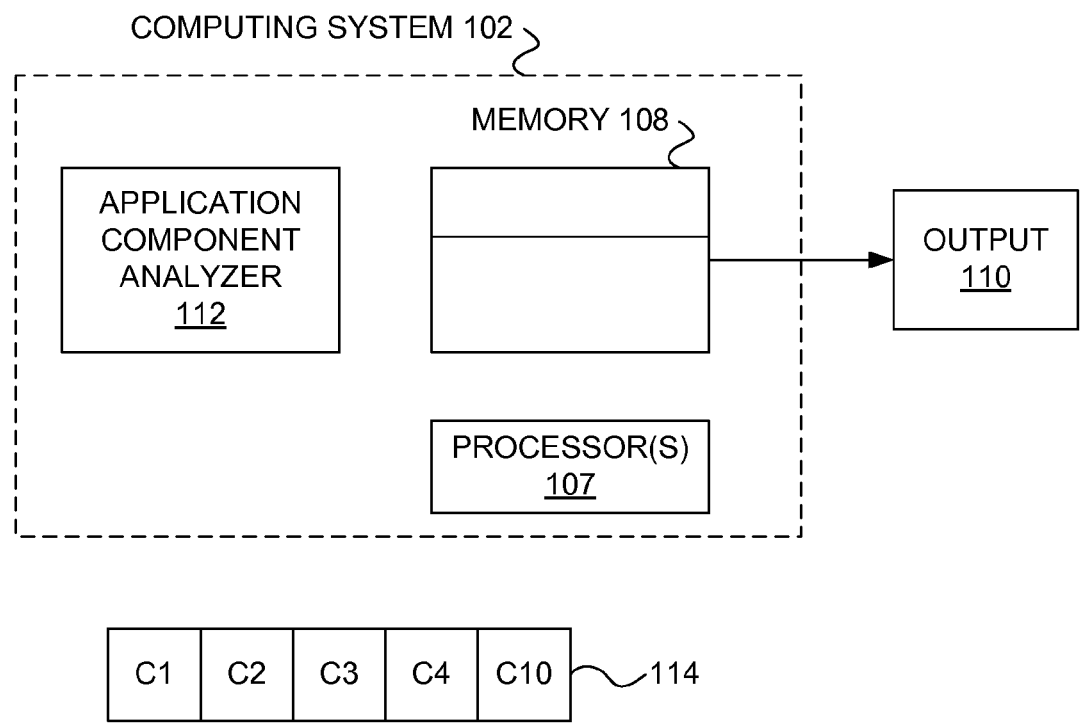

As noted in the background section, a computer program (e.g., an application program) can be comprised of many individual components (e.g., application program components). As such, those skilled in the art readily appreciate that execution of a computer program could require loading many individual components into memory.

Modern gaming environments provide an example of a computing environment where execution of a gaming application program (e.g., a game) can require loading many individual gaming application program components (or gaming components) into the memory of a gaming machine (unit or device) for execution to, for example, effectively provide a game to one or more individuals (players) for play in a gaming environment that may be subject to a number gaming regulations. Furthermore, in some computing environments, many variations or configurations of essentially the same application program may be available (e.g., a poker game may have several different variations with different graphics). In such environments, there is often a need to provide numerous variations of essentially the same application program. Moreover, it is highly desirable to have the ability to change between different variations and/or configurations of the same application program, as well as providing and switching between several entirely different application programs. Again, modern gaming environments provide a good example as they often provide many different application programs to support various kinds of games (e.g., poker, blackjack, roulette, slots). Moreover, a general game or game category (e.g., poker game) may have many different variations and/or configurations. These variations and/or configurations can, for example, be based on different presentation forms (e.g., graphics and/or symbols used), substantive game differences (e.g., game rules, pay tables) and various other differences (e.g., bonusing games provided). This means that numerous different application programs and/or variations of essentially the same application program could be made available for play effectively on the same gaming machine. In other words, a modern gaming machine might often have to switch back and forth between several different types of games and/or subtle variations of essentially the same game in order to provide different types of games and/or different variations of the same game.

Modern gaming environments also provide an example of a computing environment where gaming applications and especially variations of the same gaming application may have common components. In other words, various application program configurations that are effectively supported by a gaming environment or system may have common components. However, conventional techniques generally load all of the application components into memory without taking into account that one or more of the application components could be already stored into memory and consequently available for execution. The component can, for example, be already loaded into memory as a result of loading and/or execution of one or more other application programs or other variations of the same application program. Conventionally, each application program (or application configuration) can be packaged as an application package and loaded into the memory in its entirety for execution. As a result, application components can be unnecessarily loaded and unloaded from memory as, for example, common components are reloaded even though they are already available. This can adversely affect the performance of computing systems, especially in computing environments where many applications and their variations need to be provided often rapidly and on demand (e.g., modern gaming environments that need to provide many games and their settle variations often quickly and on demand for players). As such, improved techniques for execution of multiple application programs are needed.

Accordingly, the invention pertains to techniques for execution of multiple application programs and their variations. In accordance with one aspect of the invention, one or more individual application program components (or application components) that are determined to be already stored and/or loaded into memory are not loaded into memory again, thereby allowing the associated application program to be executed without unnecessarily reloading the one or more individual application program components into memory. Generally, by keeping track and/or predicting of the application components loaded into memory, it can be determined whether to load or unload a particular application component. In addition, it will be appreciated that data that can readily identify the application components that are not already into memory can be provided as differential application data for various application programs.

In one embodiment, differential application data is provided to effectively identify one or more individual application program components that need to be loaded (i.e., application components that are not already loaded into memory) so that they can be individually loaded instead of loading the entire application program into memory including the application components that are already stored in the memory. Typically, the common application components need not be reloaded and are consequently available for execution. These common components can be stored and/or loaded in the memory, for example, as result of loading and/or execution of one or more other application programs or previous loading and/or execution of the same application program and/or its variation.

The differential application data can, for example, effectively identify one or more individual application program components that need to be loaded in order to execute an application program. It will be appreciated that the one or more individual application program components identified by the differential application data can represent a subset of the components needed for execution of the application program. By way of example, the differential application data can effectively identify only a first component of the application program for loading even though the application program requires several other components. Generally, differential application data can effectively define the difference between a plurality of application programs (and/or variations of essentially the same application program) with respect to their individual application program components. As such, the differential application data can, for example, be provided as a matrix for two or more application programs (e.g., 2×2 matrix for two application programs, dimensional 3×3 matrix for three application programs).

In accordance with another aspect of the invention, individual components of two or more application programs are effectively compared to determine a loading strategy that would avoid unnecessarily loading and/or unloading of the common components when the application programs are executed. Generally, the application programs can be executed concurrently and/or sequentially. It will be appreciated that the application programs can be compared during the execution time to determine whether they have a common application component. In addition, differential application data the effectively defines the difference between the application programs with respect to their individual components can be generated, stored and subsequently used to enhance performance.

In accordance yet another aspect of the invention, multiple application programs and/or variations of essentially the same application program can be executed based on the differential application data that effectively describes loading instructions depending on the application programs that have been executed and/or currently executing. In one embodiment, differential application data associated with a first application program to be executed is obtained. The differential application data includes loading instructions based on the one or more other application programs that been executed and/or currently executing. Again, it should be noted that the one or more other application programs can be variations of the essentially the same application program or entirely different application programs. By way of example, the differential application data for the first application program can effectively identify one or more application components to be loaded in memory for the first application program when second and/or third application programs have been previously executed and/or are to be executed concurrently with the first application program. As another example, the differential application data for the first application program can effectively identify one or more application program components to be loaded in memory for execution of the first application program when the first application is to be executed instead and/or concurrently with a fourth application program, and so on. As such, differential application data can be provided as data readily available to accommodate the need to quickly change between several application programs and/or their variations what is provided.

Embodiments of these aspects of the invention are discussed below with reference to FIGS. 1A-10. However, those skilled in the art will readily appreciate that the detailed description given herein with respect to these figures is for explanatory purposes as the invention extends beyond these limited embodiments.

FIG. 1A depicts a computer system 100 in accordance with one embodiment of the invention. Referring to FIG. 1A, a computing system 102 operates in the computing environment 100. The computing system 102 can execute one or more application programs 104, 106 and 114. More particularly, one or more processors 107 provided for the computing system 102 can effectively execute an application program 104, 106 and/or 114 (e.g., a game, word processor, calculator). Typically, an application program needs to be loaded in a portion of memory that can be made available to one or more execution instances of the application by the processor(s) 102. It should be noted that in some environments (e.g., modern gaming environments), there may be several specific configurations of what can be considered to be the same general application program. By way of example, several versions of a poker game may be available where a version may have a minor or major variation from another version. These variations can, for example, include different sounds, graphics, bonus games and/or paytables used to determine the outcome of a game of chance played in modern gaming environments. Thus, an application program (e.g., a video poker game) may have many different variations corresponding to different application configurations. Referring back to FIG. 1A, several variations of an application program A are depicted (A1, A2 and A3). Each particular variation is shown as a particular configuration of individual components.

By way of example, the computing system 102 can initially execute a particular application configuration, namely the application program 104. Subsequently, the computing system 102 can receive, identify and/or determine a different application configuration 114 for execution. The application configuration 114 can, for example, be a variation of the essentially the same application program that is also provided as the application configuration 104. As such, the application configuration 114 can have several application components in common with the application configuration 104 as both of the application configurations can, for example, represent essentially the same application program. It will be appreciated that the application component analyzer 112 can effectively determine that there is no need to reload application components that are already loaded in memory 108. This means that when the computing system 102 effectively continues execution from application configuration 104 to 114, application components that are common between the two application configurations (or applications) are not reloaded into the memory 108. As a result, application components, C1, C2, C3 and C4 are not needlessly unloaded and/or loaded into the memory 108. This means that application component analyzer 112 can effectively determine that only application component C10 needs to be loaded into memory 108. It should be noted that the application component C10 can effectively replace the application component C5. As such, the application component analyzer 112 can effectively unload the application component C5 from memory 108.

FIG. 1A depicts a computing system 102 in a computing environment 100 in accordance with one embodiment of the invention. Referring to FIG. 1A, the computing system 102 is operable to execute computer application programs (application programs) 104 and 106. More particularly, an application program (104 and/or 106) can be executed by one or more processors 107 to achieve a desired result. Execution of an application program can result in generating of an output 110 in various forms including, for example, data that can be displayed.

Typically, executing an application program (104, 106 and/or 108) requires loading one or more of its individual application components (application components) into memory 108 made effectively accessible to the one or more processors 107 when the application program is executed. As such, execution of the application program 104 would require storing into the memory 108 the application components that effectively makeup the application program 104 (C1, C2, C3, C4 and C5). Conventionally, all of the individual components of the application program 104 are loaded into memory 108 in order to execute the application program 104. The application program 104 can, for example, be packaged into an application program package that is loaded entirely into memory 108 before the application program 104 is executed. Similarly, execution of a second application program, namely, application program 106 would require loading all its individual application components (C6, C7, C8, C9 and C10) into memory 108. It should be noted that prior to loading the second application program (106), the first application program (104) can be effectively unloaded from the memory 108 and/or be partially or entirely overwritten.

An application program can be comprised of many individual application program components. As such, those skilled in the art readily appreciate that execution of an application program could require loading many individual application components into memory for execution of the application program. Modern gaming environments provide an example of a computing environment where gaming application programs (or games) can require loading many individual application program components into memory of a gaming machine (unit or device) for execution to effectively provide the game to one or more individuals (players) for play in a gaming environment that may be subject to a number gaming regulation. To further elaborate, gaming machines are briefly discussed below.

Furthermore, in some computing environments there may be many variations or configurations of essentially the same application program (e.g., A poker game may have several different variations with different graphics). Often, there is a need to provide numerous variations of essentially the same application program. Moreover, it is highly desirable to have the ability to change between different variations, configurations of the same application program as well as the many entirely different application programs.

As an example, modern gaming environments provide many different application programs to support various kinds of games (e.g., poker, blackjack, roulette, slots) that can be played today. Moreover, a general game or game category (e.g., poker) may have many different variations and/or configurations. These variations and/or configurations can, for example, be based on different presentation forms (e.g., graphics and/or symbols used), substantive game differences (e.g., game rules, pay tables) and various other differences (e.g., bonusing games provided). This means that numerous different application programs and/or variations of essentially the same application program could be made available for play effectively on the same gaming machine. In other words, a modern gaming machine might often have to switch back and forth between several different types of games and/or subtle variations of essentially the same game in order to provide different types of games and/or different variations of the same game.

Modern gaming environments also provide an example of a computing environment where application program and especially variations of the same application may have common components. In other words, various application program configurations used may have one or more common application components. However, conventional techniques generally load all of the application components into memory without taking into account that one ore more of the application components could be already loaded into memory. Typically, each application configuration is packaged and loaded in to memory in its entirety. It will be appreciated that an application component analyzer 112 can effectively determine whether the components needed to execute an application program are already loaded into memory 108 so that the application program components are not needlessly loaded into memory 108.

Figure 1B:
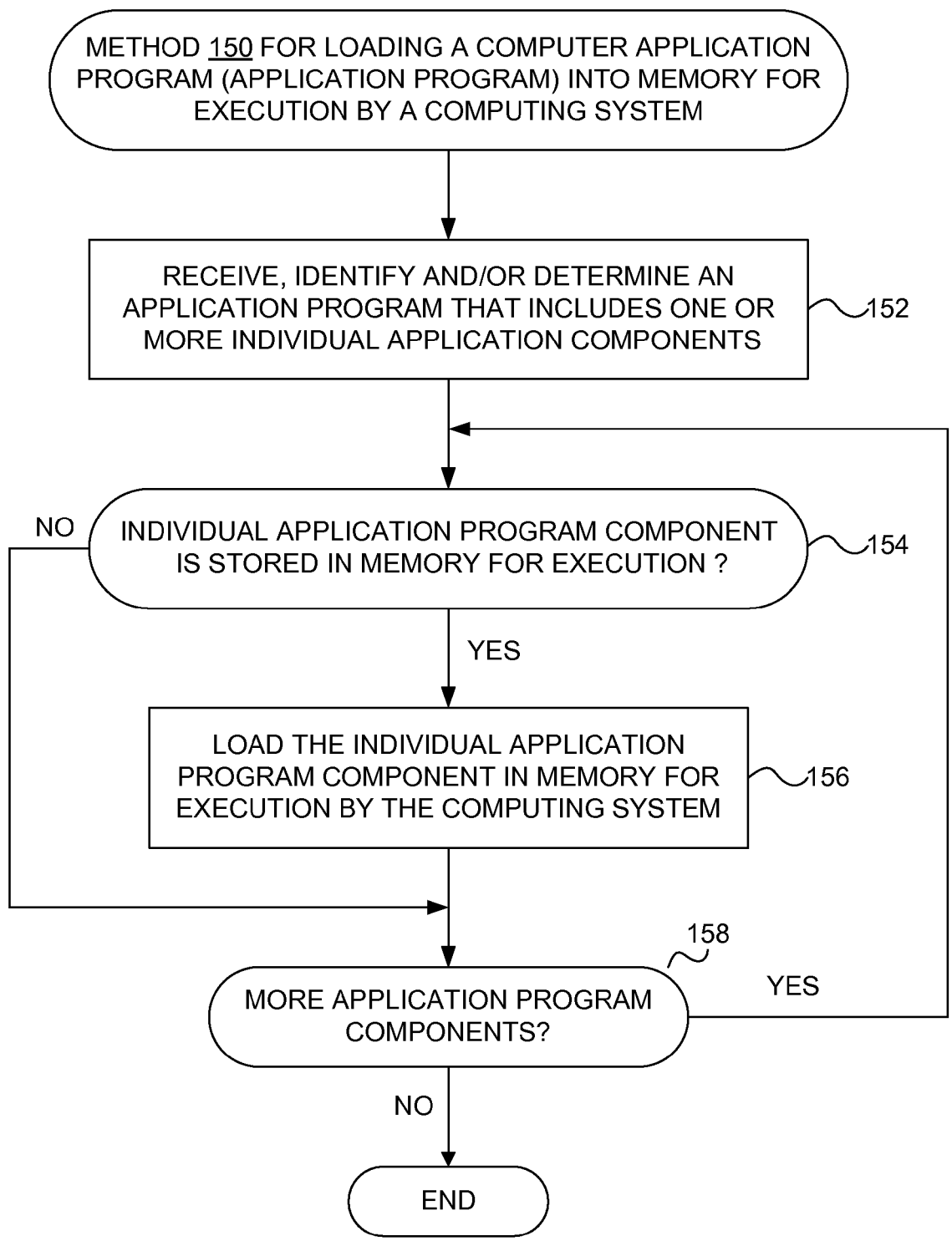
FIG. 1B depicts a method for loading a computer application program (application program) into memory for execution by a computing system in accordance with one embodiment of the invention.

FIG. 1B depicts a method 150 for loading a computer application program (application program) into memory for execution by a computing system in accordance with one embodiment of the invention. Method 150 can, for example, be used in the computing environment 100 depicted in FIG. 1A to load one or more application programs 104, 106 and 114 into memory 108 for execution by the computing system 102.

Initially, an application program is received, identified and/or determined (152). The application program can include one or more individual application program components. Typically, the application program includes a plurality of individual application program components that effectively make up the application program or particular application program configuration. Those skilled in the art will readily appreciate that execution of an application program can require storing into memory all of its individual components.

In any case, after the application program is received, identified and/or determined (152), it is determined (154) whether an individual application component of the application program is stored in the memory for execution by the computing system. It will be appreciated that the determining (154) can, for example, effectively determine whether an individual application program component is stored into memory as a result of a previous or concurrent execution of one or more application programs and/or variations of the same application program. Those skilled in the art will readily appreciate that loading an application component in memory for execution typically requires loading it into a memory portion where it can be effectively accessed by one or more processors when the application program is executed. Referring back to FIG. 1B, if it is determined (154) that a particular application component is not stored in the memory for execution by the computing system, the particular application component is loaded (156) into memory for execution by the computing system. It should be noted that loading of an application component may effectively cause the unloading of another application component as the other application component can, for example, be overwritten by the application component that is loaded into memory.

Referring to FIG. 1B, a particular application program component is needed for execution can be loaded (156) into memory if it is determined (154) that the application program is not stored in the memory for execution as a result of a previous execution of the same and/or other application program(s). Moreover, it will be appreciated that if it is determined (154) that an individual application program component is stored in the memory, the application program component is not loaded into the memory for execution by the computing system. In other words, an application program component is not needlessly loaded into memory when it is determined (154) that it is already stored in the memory, for example, as a result of a previous or concurrent execution of the same or different application program consequently available for execution of the application program that is to be executed.

In effect, the method 150 can determine whether each of the one or more individual application program components of the application program are stored into memory. The application program components that are not stored in the memory can be loaded (156) into the memory, but an application program component is not needlessly loaded into memory if it is determined (154) that the application program component is already stored into memory as a result of a previous execution of an application program. In other words, method 150 effectively considers whether each of the individual application components need for execution.

Figure 2A:
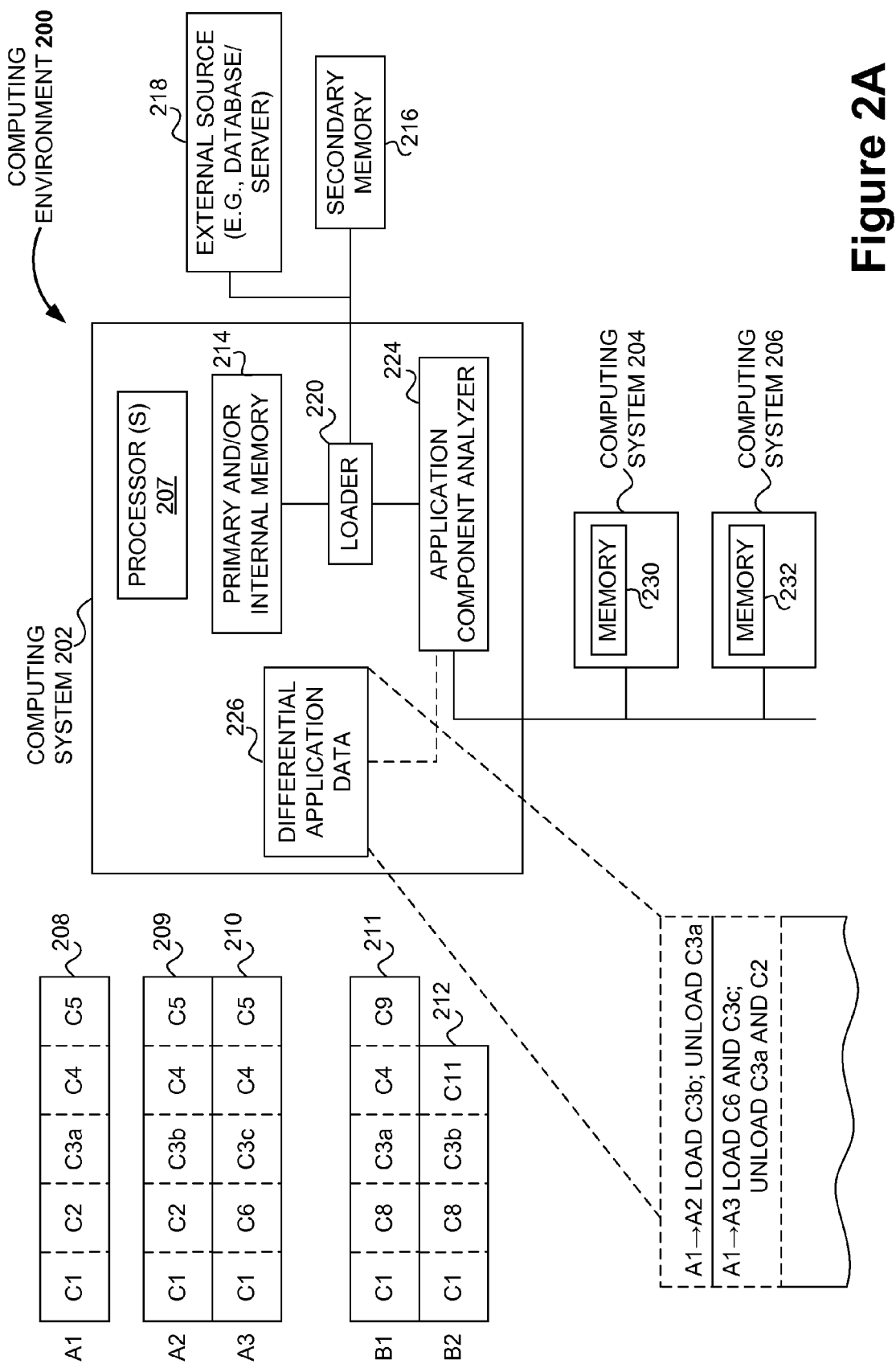
FIG. 2A depicts a computing environment in accordance with one embodiment of the invention.

FIG. 2A depicts a computing environment 200 in accordance with one embodiment of the invention. Referring to FIG. 2A, a number of computing systems (202, 204 and 206) are provided for various computing tasks in the computing environment 200. Typically, the computing system (202) includes one or more processors 207 configured and/or operable for execution of one or more application programs (208, 209, 210, 211 and 212). Each of these application programs can be represented by a number of individual application components. For example, application program 208 (A1) can be represented by individual application components C1, C2, C3a, C4 and C5. Typically, all of the individual application components of an application program need to be stored in a primary and/or internal memory 214 of the computing system 202 for execution. For example, in order to execute the application program 208(A1), all of its individual application components (C1, C2, C3a, C4 and C5) need to be stored into the primary and/or internal memory 214 of the computing system 202. The application programs can, for example, be available from and/or stored in a secondary memory (216) and/or external source (e.g., a database server 218). Those skilled in the art will appreciate that a loader (220) can be provided to effectively retrieve the application programs (208, 209, 210, 211 and 212) from the secondary memory (216) and/or external source (218) and effectively load them into the primary and/or internal memory (214).

Moreover, an application component analyzer (224) is effectively provided for the computing system (202) to allow more intelligent loading and/or unloading of various individual application program components. More particularly, the application component analyzer (224) can receive, identify and/or obtain differential application program data (or differential application data) (226) that includes information pertaining various individual application program components to be loaded into and/or unloaded from primary and/or internal memory (214). This information can be used to determine what individual application components need to be loaded for execution of an application program and/or specific configuration of an application program. Differential application data (226) can, for example, be stored in the computing system 202, secondary memory 216, external source (218), computing systems 204 and 206 and/or another storage in the computing environment 200 (not shown).

It will be appreciated that the differential application data (226), among other things, can assist in determining the application components that need to be loaded and/or unloaded when the execution effectively switches from one application program to another. By way of example, when the execution changes from the execution of the application program 208 (A1) to execution of the application program 209(A2), the differential application data 229 can effectively indicate that the individual application program component C3b needs to be loaded and/or the individual application program component C3a can be unloaded. Referring to FIG. 2A, it should be noted that the application program 208(A1) includes the component C3a which is not included in the application program 209(A2). Instead, the application program 209(A2) includes component C3b not included in the application program 208 (A1). The remaining components (C1, C2, C4 and C5) are common between the two application programs. As another example, when the execution switches from the execution of the application program 208(A1) to execution of the application program 210(A3), the differential application data 226 can effectively indicate that the individual components C6 and C3c need to be effectively loaded and/or the application components C3a and C2 can be unloaded, and so on.

Generally, when the execution switches from execution of one application program to another, the differential application data 226 can effectively indicate that one or more individual application program components stored in the primary and/or internal memory (214) can be unloaded and/or one or more individual components need to be loaded by the loader (220) into the primary or internal memory (214) for execution. Although the operation of application component analyzer (224) was described with respect to loading into memory 214 and execution by the computing system 202, those skilled in the art will readily appreciate that the application component analyzer (224) can also effectively assist other computing systems (204 and 206) in determining which individual application program components need to be loaded into respective memories 230 and 232 for execution. As such, the computing system 202 can effectively behave as, for example, a server to the computing systems 230 and 232.

FIG. 2B depicts differential application data 230 provided for a number of application programs in accordance with one embodiment of the invention. Referring to FIG. 2B, different application programs A, B and C are provided for a computing environment. It should be noted that each of the application programs A, B and C have variations and/or different configurations. As such, application programs (or configurations) A1, A2 and A3 can, for example, represent variations of essentially the same application program A, and so on. The depicts differential application data 230 is provided as general matrix that effectively identifies the general differences between the application programs A, B and C. As such, an entry 232 can effectively indicate that one or more application program components are to be loaded into memory (C1 and C2) and/or unloaded from the memory (C3 and C4) when the execution switches from the execution of one of the variations of the application program A (A1, A2 and A3) to the execution of one of the variations of the application program B (B1 and B2). Similarly, other entries in the matrix can effectively identifies one or more application program components to be loaded into and unloaded from the memory when the execution switches between two general application programs (e.g., when execution switches from execution a poker game to slot game)

FIG. 2C depicts differential application data 234 provided as an application specific matrix for an application program in accordance with another embodiment of the invention. Referring to FIG. 2C, an application specific matrix 234 is provided for the application program A. The application specific matrix 234 can effectively identify one or more components to be unloaded and/or loaded when the execution switches between two variations of the application program (e.g., when execution of a slot game switches between different game tables and/or graphics). For example, an entry 236 can effectively indicate that one or more application program components are to be loaded into memory (Ca1 and Ca2) and/or unloaded from the memory (Ca3 and Ca4) when the execution switches from the execution of the Application program A1 to A2 (i.e., execution switches from a particular variation of the application A (A1) to another variation of the application program A (A2).

FIG. 2C depicts differential application data 238 in accordance with yet another embodiment of the invention. Referring to FIG. 2C, the differential application data 238 is provided as a matrix for each of the particular variations and/or configurations of the application programs that are made available in a computing environment. As such, an matrix entry 240 can, for example, indicate that one or more application program components need to be loaded into and/or unloaded form memory when the execution changes from execution of application program A3 (i.e., a particular variation and/or variation of the Application program A) to application program B2 (i.e., a particular variation and/or variation of the Application program B), and so on.

FIG. 2D depicts differential application data 242 in accordance with still another embodiment of the invention. Referring to FIG. 2D, the differential application data 242 is effectively provided as a resource list listing the application program components of a particular variation and/or configuration of the application program A, namely application program A2. It should be noted that a loaded/unload indicator 244 can be provided for each of the application program components to effectively indicate the loading status of the application program components (e.g., loaded, unloaded). It will be readily appreciated that differential application data can be provided for other particular variations and/or configuration of the application program A in a similar manner. It should be noted that the differential application data 242 can be provided for general categories of application programs (A, B and C) in a similar manner as that depicted, for example, in FIG. 2D.

FIG. 2E depicts differential application data 246 in accordance with one more embodiment of the invention. Referring to FIG. 2E, the differential application data 246 effectively provides a loading counter 248 that can be updated (e.g., incremented when a component is loaded) based on the loading and/or unloading of an application component listed for a general or specific application program (or application configuration). It will be appreciated that the loading counter 248 can be provided instead or in combination with the loading indicator 244 shown in FIG. 2D. Furthermore, a list of the components that are currently loaded into memory can be generated and maintained as a global resource list that can be used alone or in conjunction with other general and/or application specific matrices and/or lists in order to effectively provide differential application data. FIG. 2F depicts differential application data 249 in accordance with one more embodiments of the invention. Referring to FIG. 2F, differential application data 249 is provided as a global resource list the effectively lists the application program components that are loaded into memory for execution.

As noted above, modern gaming environments are an example of a computing environment where numerous variations and/or configurations of application programs (or gaming application programs) are used. These variations and/or configurations can be different variations of what can be considered to be essentially the same application program. Furthermore, the variations and/or configurations of gaming application programs (or games) can be categorized based on one or more criteria (e.g., variations of a poker game can be organized based on the pay tables used). Moreover, differential application data can be provided based on one or more criteria distinguishing the variations and/or configurations of a game. To further elaborate, FIG. 2G depicts differential application data 280 provided for a gaming environment. Referring to FIG. 2G, the differential application data 280 is provided as a matrix for various pay tables (PTY1, PTY2 and PYT3). It will readily be appreciated that matrix entries can effectively indicate one or more application program components are to be loaded in and/or unloaded from memory when a different pay table is used (e.g., when the execution changes from executing a game with a first pay table to a second pay table). Referring to FIG. 2H, differential application data is depicted as a resource list for a pay table in accordance with one embodiment of the invention. It will readily be appreciated that a reference count and/or a loading indicator can be provided for each of the listed application components in a similar manner as noted above.

Figure 2I:
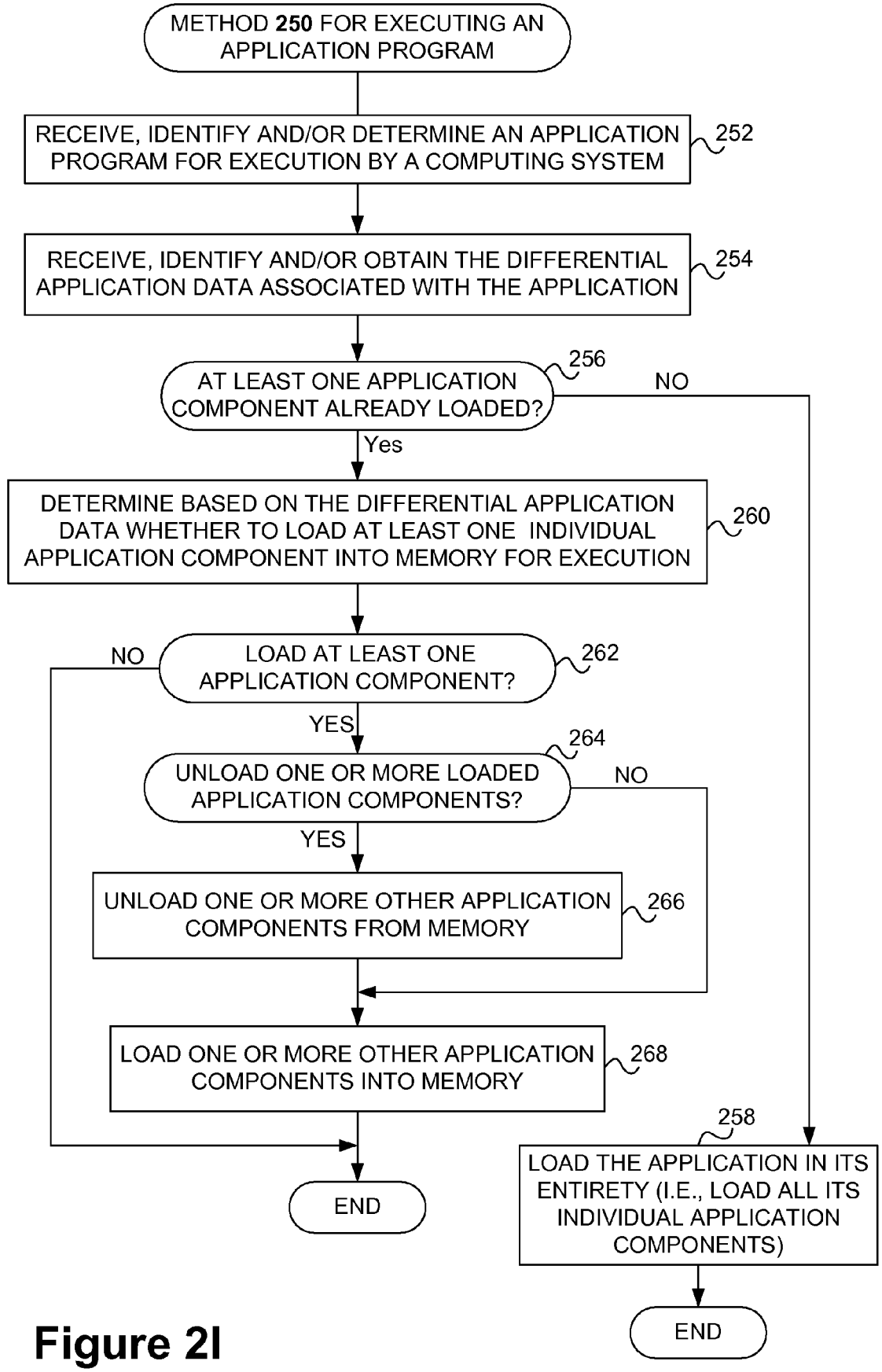
FIG. 2I depicts a method for executing an application program in accordance with one embodiment of the invention.

FIG. 2I depicts a method 250 for executing an application program in accordance with one embodiment of the invention. Initially, an application program is received, identified and/or determined (252) for execution by a computing system. Next, differential application data is received, identified and/or obtained (254). Generally, the differential application data can effectively describe the differences between the environment needed to execute the application program and that are already available. The differential application data is associated with the application program that is to be executed. The differential application data, among other things, can effectively indicate that one or more individual application components of the application program need not be loaded into memory for execution of the application program. Typically, the one or more individual application program components are stored in memory as the result of a previous execution of the same and/or other application programs. In other words, the differential application data can effectively identify one or more individual application program components that need to be loaded into memory. In addition, the differential application data can effectively indicate that one or more other application program components can be unloaded from and/or overwritten in the memory. Such a component can, for example, be a component associated with an application program which has been previously executed. Generally, an application program component identified for unloading is no longer needed as it is not required for the execution of the application program that is executing or about to be executed is not accessed for execution of the application program that is to be executed.

Referring back to FIG. 2B, it is determined (256) whether at least one application program component of the application program that is to be executed is already loaded into memory for execution. If it is determined (256), based on differential application data, that at least one application program component is not loaded in the memory for execution, the application is loaded (258) in its entirety into the memory (i.e., all application components of the application program are loaded into memory for execution). Method 250 ends following the loading (258) of the application in its entirety. However, if it is determined (256) that at least one application component is already loaded into memory for execution, it is determined (260), based on the differential application data, whether to load at least one individual application component into memory for execution. Accordingly, if it is determined (262) whether to load at least one application program component into the memory for execution. If it is determined (262) not to load at least one application program component, the method 250 ends. In effect, no individual application program component is loaded into memory for execution of the application program if it is determined based on the differential application data that all of the application program components are already loaded into memory and consequently available for the execution of the application program. On the other hand, if it is determined (262) to load at least one application program component, it is determined (264) whether to unload one or more application program components. Accordingly, if it is determined (264) to unload one or more application components, one or more application components can be unloaded (266) from the memory. By way of example, one or more application components which are no longer needed can be identified and marked to be overwritten by other application components needed for execution of the application program.

Subsequently, one or more application program components are loaded (266) into memory for execution of the application program. It will be appreciated that the one or more application program components that are loaded into memory are not needed for the execution of the application program. Moreover, the method 250 can effectively identify only the application program components that are needed but not already stored into the memory. After one or more application program components are loaded (268) into memory for execution of the application program, the method 250 ends.

Figure 3A:
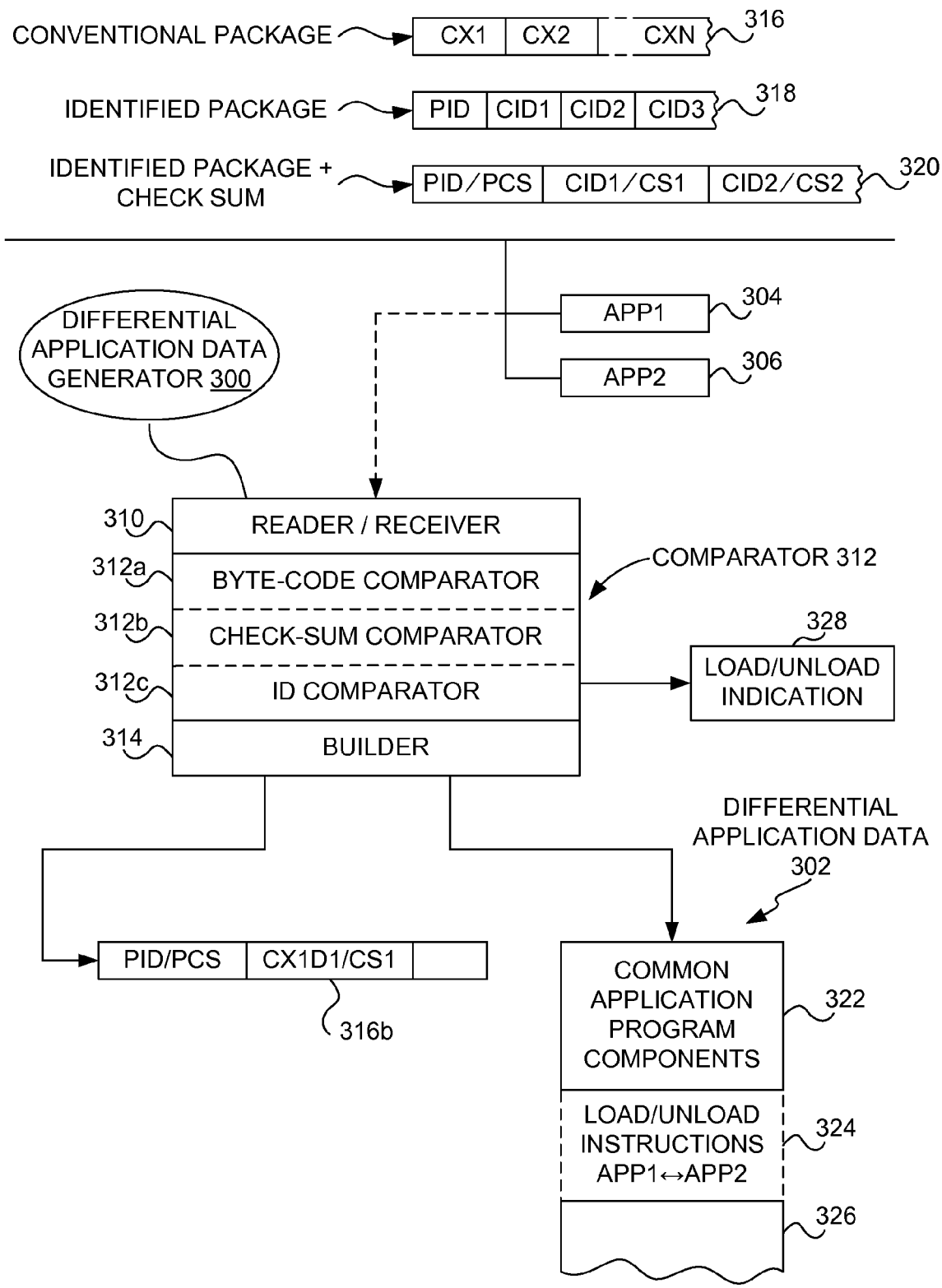
FIG. 3A depicts a differential application data generator for generation of differential application data in accordance with one embodiment of the invention.

As noted above, differential application data can be used to execute different application programs and/or specific application program configurations. It will be appreciated that differential application data can be generated in accordance with one aspect of the invention. FIG. 3A depicts a differential application data generator 300 for generation of differential application data (302) in accordance with one embodiment of the invention. Generally, the differential application data generator 300 can receive, identify and/or determine a plurality of application programs (304 and 306), generate differential application data 302 which effectively identifies and/or indicates one or more common application program components between the application program (304 and 306) and/or provides loading/unloading instructions for switching between the application programs (304 and 306). Conceptually, the differential application data generator 300 can be represented by a reader/receiver (310), a comparator (312) and a builder (314). The reader/receiver component (310) is configured to effectively receive the application programs (304 and 306). It will be appreciated that the application programs 304 and 306 can be in various forms including currently existing and/or conventionally arranged application programs. As such, the differential application data generator 300 can, for example, receive an existing and/or conventional application program package. In addition, the differential application data generator 300 can also receive application programs arranged in various other forms and/or packages configured and/or pre-processed in accordance with other embodiments of the invention.

Referring to FIG. 3A, an identified application program package (identified package 318) is depicted with a package ID/name and a number of components ID/names CID1, CID2 and CID3. FIG. 3A also depicts one application program package (320) in accordance with another embodiment of the invention. The application package 320 includes both IDs/names and checksums for the individual application components as well as a package ID/name and a package checksum for the application package. Referring to FIG. 3A, a conventional application program package 316 does not provide identifiers/names or checksums. Those skilled in the art will readily appreciate that the comparator (312) of the differential application data generator 300 can effectively include one or more components in order to process conventional package (316) and/or other application program packages configured or arranged in accordance with various embodiments of the invention (318 and 320). The comparator (312) can include a byte-code comparator (312a), a checksum comparator (312b) and/or an ID comparator (312c). The byte-code comparator (312a) can effectively compare the individual bytes of application programs 304 and 306. Similarly, the checksum comparator 312b and the ID comparator 312c can compare the checksums and the IDs/names assigned to packages and individual application program components.

In effect, one or more components of the comparator (312) can be used to effectively compare various individual application components of the application programs 304 and 306. To determine whether there is a common application program components and/or effectively provide load/unload instructions that can be used to switch the execution between the two application programs 304 and 306. The information effectively provided by the comparator (312) can be used by the builder (314) to generate differential application data 302. The differential application data 302 can, for example, include a portion 322 that effectively identifies one or more common individual application components shared between the application programs 304 and 306, load/unload instructions 324 that effectively indicate to load/unload one or more individual application components when the execution changes from the application program 304 to application program 306 and/or vice versa.

In addition, other information relating to loading/unloading of the application programs 304 and 306 can be provided in a portion (326). The information provided in portion 326 can, for example, provide strategic data relating to expected load times of application program components, frequency of expected use, and so on. It should be noted that the builder component (314) can be configured to effectively transform the conventional package 316 into a package that identifies its individual application program components and is arranged in accordance with one or more embodiments of the invention. By way of example, the conventional application program package 316 can be effectively transformed into an identified package 316b that provides ID/name and package checksum for all of its individual application program components as well as a package ID/name and checksum. Typically, the application package 316b is formed after the conventional package has been processed by the comparator (312).

It should also be noted that the differential application data generator 300 can generate a load/unload indication 328 to effectively indicate that one or more application program components that are to be loaded and/or unloaded when execution switches between the application programs (304 and 306). Those skilled in the art will appreciate that the load/unload indication (328) can be generated during runtime to allow switching between the application programs (304) and (306) in a dynamic manner. The load/unload indication (328) can, for example, be provided to a loader to allow the loader to effectively load and/or unload various individual application components to and/or from the memory. It should further be noted that the load/unload indication (328) can be generated without and/or prior to the generation of the differential application data (302). As such, a computing system can be provided with the ability to analyze various application programs in a dynamic manner without generating differential application data or differential application data can be generated after the generation of the loading/unloading indication 328 and possibly after loading and/or unloading of the individual application components. Differential application data generated in this manner can be used subsequently. In other words, subsequent execution can benefit from the differential application data generated even though the differential application data was not used for loading/unloading of the application program. Conventional application programs can also be reformatted into identified packages for subsequent execution. A computing system that can effectively process application programs in a dynamic manner is discussed below in order to make intelligent decisions about loading/unloading for various components will be discussed later.

Figure 3B:
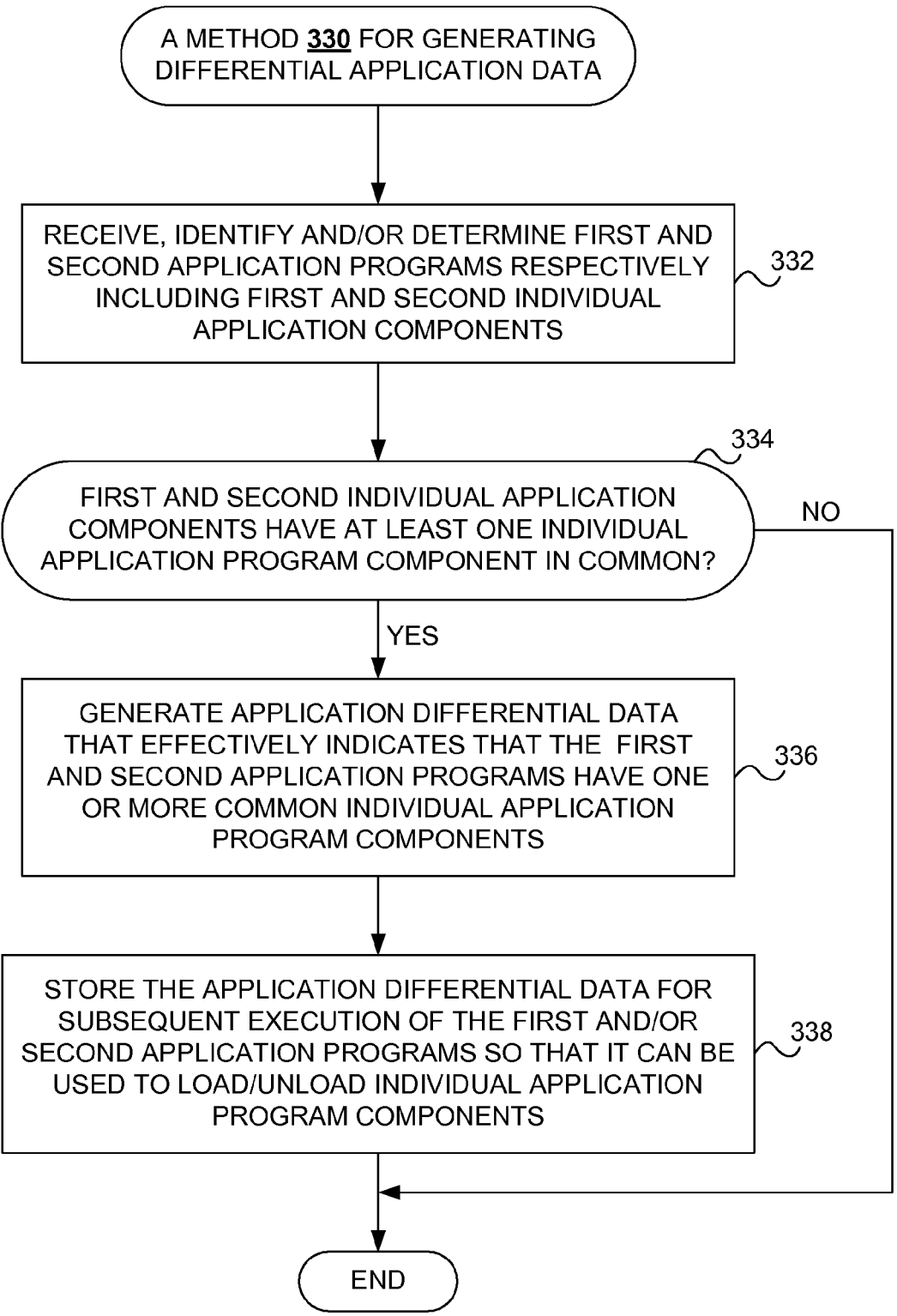
FIG. 3B depicts a method for generating differential application data in accordance with one embodiment of the invention.

FIG. 3B depicts a method 330 for generating differential application data in accordance with one embodiment of the invention. Initially, first and second application programs are received, identified and/or determined (332). The first and second application programs include respectively first and second individual application components. After the first and second application programs are received, identified and/or determined (332), it is determined (334) whether the first and second individual application components have at least one application component in common. If it is determined (334) that the first and second application components do not have at least one common component, the method 330 ends.

In effect, the differential application data would be null (or empty) if it is determined (334) that the first and second application programs do not have a common application program components. However, if it is determined (334) that the first and second application program components have a common application program component, differential application data is generated (336). The differential application data effectively indicates that the first and second application programs have one or more common individual application program components. Subsequently, the differential application data is stored (338) for subsequent execution of the first and/or second application programs. It will be appreciated that the differential application data can effectively identify one or more individual application program components for loading and/or unloading to avoid needlessly loading application program components that are already stored in memory. Because, among other thing, the common individual application components can be identified and not needlessly loaded into memory if they are already loaded into memory.

Figure 3C:
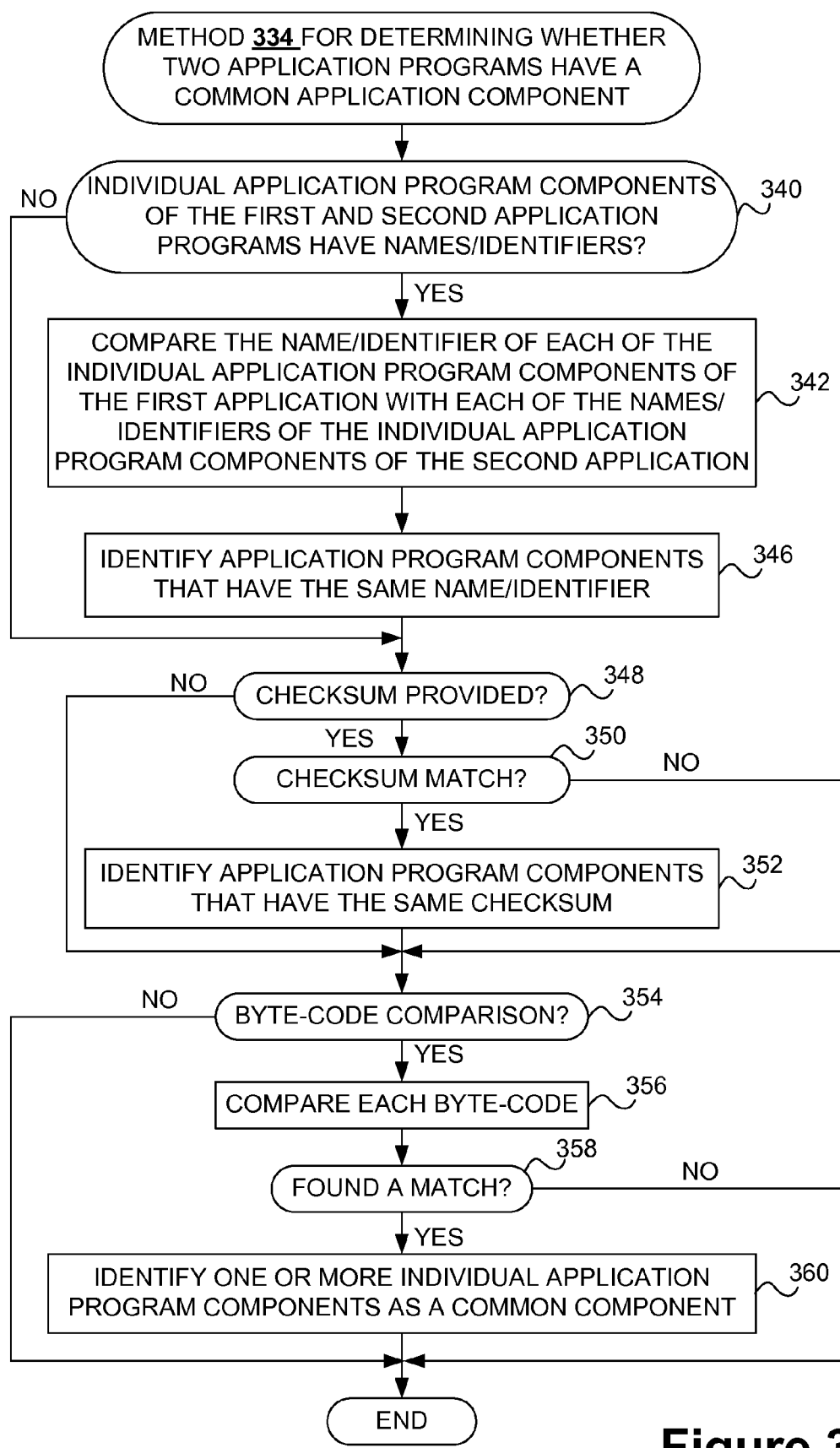
FIG. 3C depicts a method for determining whether two application programs have a common application program component in accordance with one embodiment of the invention.

FIG. 3C depicts a method 334 for determining whether two application programs have a common application program component in accordance with one embodiment of the invention. Initially, it is determined (340) whether individual application components of the first and second application programs have names/identifiers assigned to them (340). Accordingly, if it is determined (340) that the individual components of the first and second application programs have names/identifiers, the assigned names/identifiers of each of the individual components of the first application is compared (342) to the names/identifiers of the individual application program components of the second application. Thereafter, the individual application program components that have the same names/identifiers are identified (346) as common components based on the names/identifiers assigned to them. On the other hand, if it is determined (340) that the individual application program components of the first and second applications do not have names/identifiers assigned to them, it is determined (348) whether a checksum is provided for the individual application program components of the first and second application programs.

Accordingly, if it is determined (348) that the checksum is provided, it is determined (350) whether the checksums for the individual application components of the first and second application programs match. As a result, the individual application program components that have the same checksum can be identified (352). It should be noted that the checksum comparison (350) can also be performed for the application program components that are determined (340) to have to verify that the components that have a common name/identifier are in fact the same application program components. The checksum comparison (348) may also serve as a primary test in cases where the name/identifier is not provided and/or not deemed reliable. If it is determined (348) that the checksum is not provided or after identifying (352) the components that have the same checksum (352), it is determined whether to perform a byte-code comparison (354). If it is determined (354) to perform a byte-code comparison, each byte-code of each of the individual application components can be compared (356) to determine whether there is a match (358). Accordingly, one or more individual application components that are found to have the same byte-codes can be identified (369) as the common components between the two application programs. The method 334 can end following the identification (360) of one or more individual application components.

Generally, identifying common application programs can include one or more of the following operations: compare the names/identifiers, compare the checksums and/or perform bite comparison operation to individually compare each of the bites of two application components.

Figure 4A:
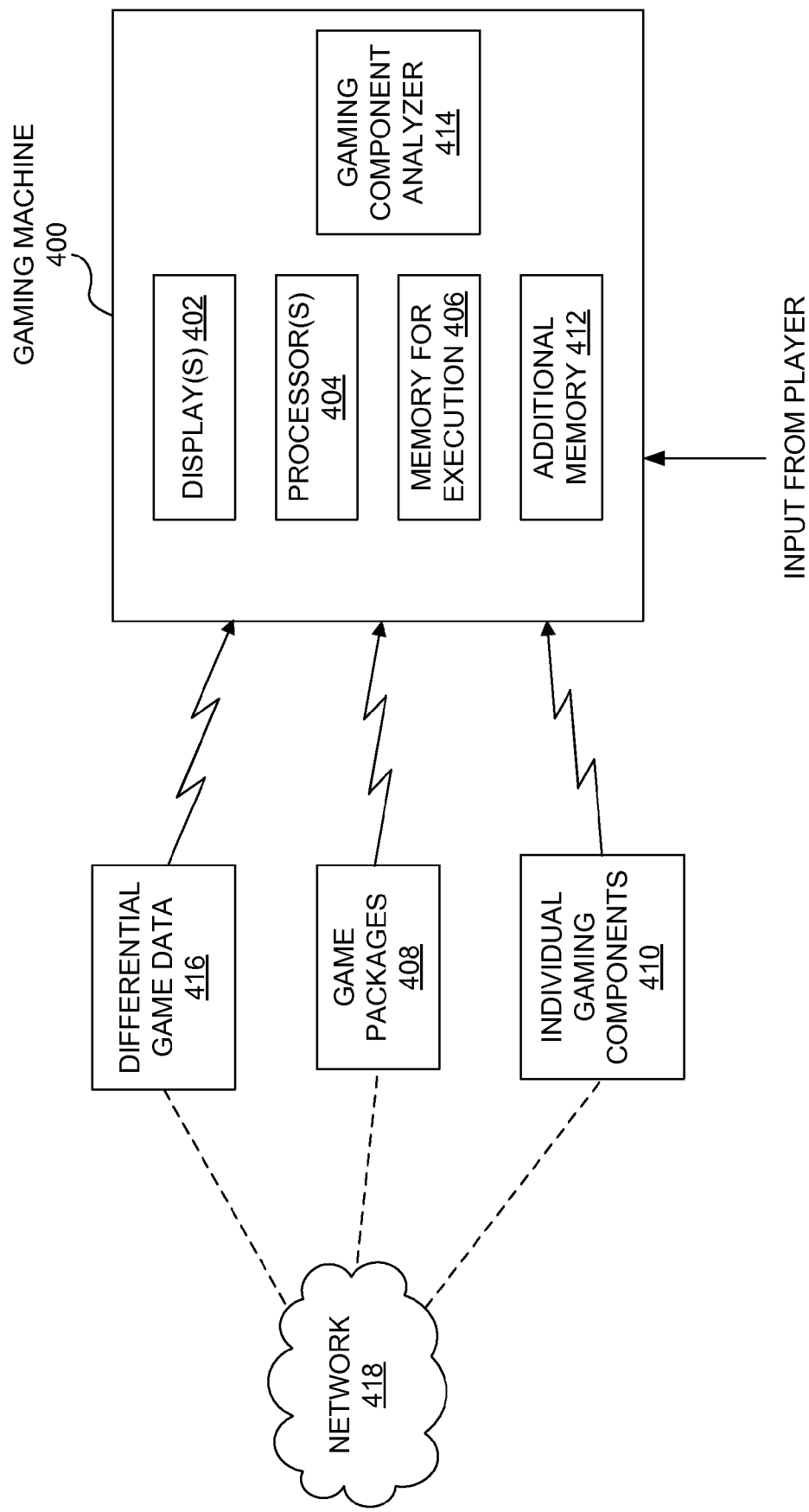
FIG. 4A depicts a gaming machine in accordance with one embodiment of the invention.

FIG. 4A depicts a gaming machine 400 in accordance with one embodiment of the invention. The gaming machine 400 can effectively provide multiple gaming application programs or games. Typically, the games are effectively provided for more individuals (or players). Game screens or graphics associated with the game can be displayed on one or more displays (402) for the player(s). The player can interact with the game and provide input to the gaming machine 400. In order to provide the game for play, a game can be loaded into the memory 406 for execution by one or more processors (404). A game is typically comprised of a number of individual gaming components. The gaming components can be packaged as a game package. One or more game packages (408) and/or individual gaming components (410) can, for example, be stored in additional memory (e.g., secondary memory) (412) of the gaming machine, or be available from an external resource or storage. The external source and/or storage can, for example, be connected to the gaming machine 400 via a wired or wireless network 418. It will be appreciated that a gaming component analyzer (414) can effectively manage switching the execution between different games. More particularly, the gaming component analyzer (414) can use differential gaming data 416 to avoid needless loading of individual gaming components when the components are already stored in memory (406) for execution. By way of example, when a first game is to be executed instead of a second game that is previously executed or is currently being executed, the gaming component analyzer (414) can effectively determine based on the differential gaming data (416) which individual gaming components need to be loaded into memory (406) in order to execute the first game.

As such, gaming components that are already loaded and/or stored in the memory (406) are not needlessly loaded. It will be appreciated that the gaming machine 400 can be connected to one or more gaming servers. Moreover, the operations of the gaming machine 400 at least with respect to the loading of gaming components for various games can be effectively controlled by one or more gaming servers.

Figure 4B:
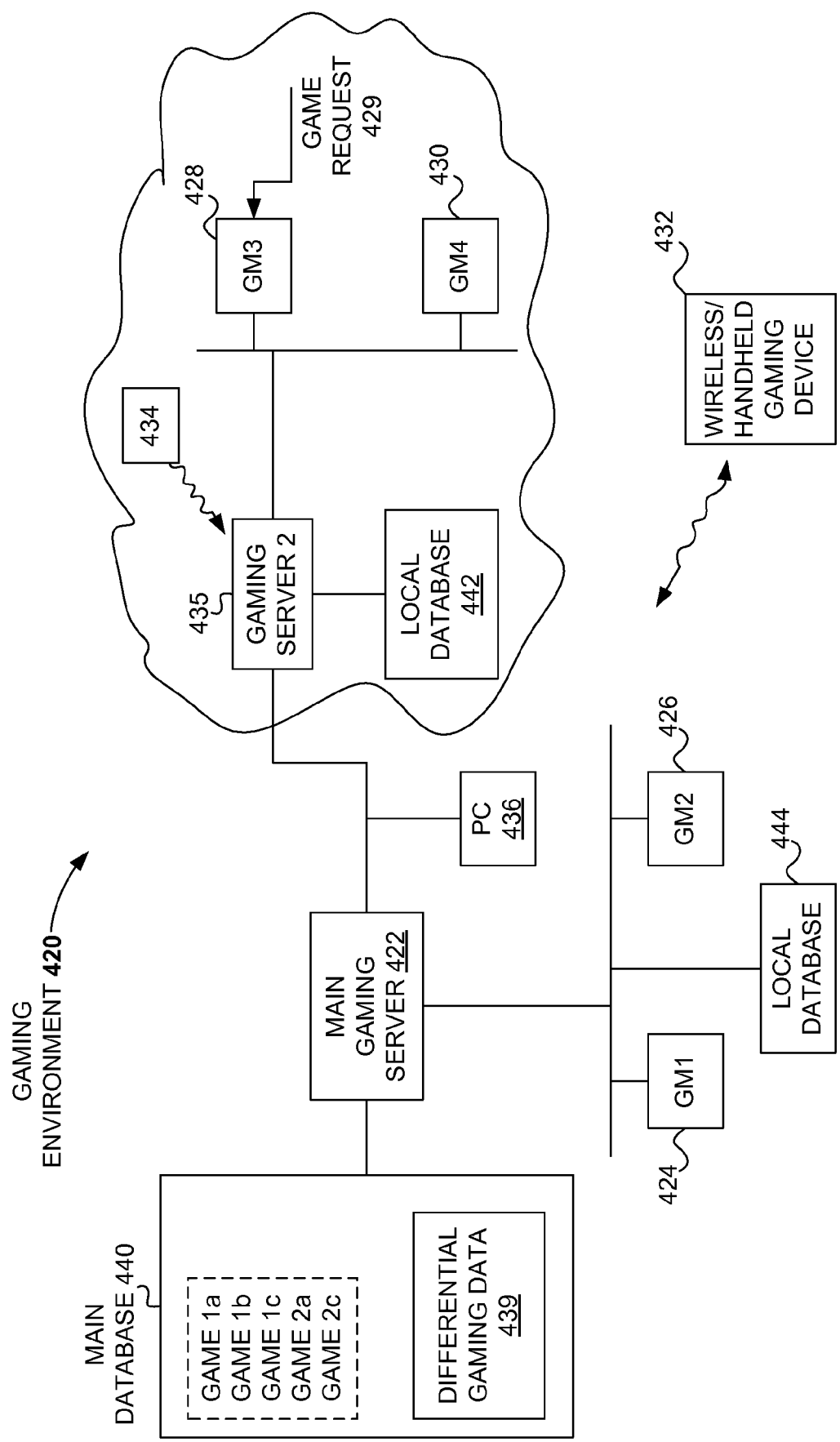
FIG. 4B depicts a gaming environment in accordance with one embodiment of the invention.

FIG. 4B depicts a gaming environment 420 in accordance with one embodiment of the invention. Referring to FIG. 4B, a main gaming server 422 can effectively control the loading operations of the gaming machines 424, 426, 428 and 430. By way of example, the loading operations of the gaming machines 424 and 426 can be directly controlled by the main gaming server 422. On the other hand, the loading operations of the gaming machines 428 and 430 can be indirectly controlled by the gaming server 422 via another gaming server 434 which is operatively connected to the main gaming machines 428 and 430. In addition, the main gaming server 422 can effectively control the loading operations of various other gaming devices including the wireless/handheld gaming devices 432 and 434 and a Personal Computer (PC) 436. Games that are effectively provided by the gaming machines and various other gaming devices can, for example, be stored in a main (or centralized) database 440 and/or various other storage or databases which may be more local to the gaming machines and/or gaming devices (442 and 444). A game can, for example, be selected for execution (or play) based on input provided by a player. As such, a different game can be provided as a result of a selection made by a player. Generally, games can be changed effectively as a result of an input received from a player and/or based on various other criteria as, for example, determined by the gaming server 422 and/or other entities (e.g., different games can be provided at different times). In any case, when there is a need to change the game that is being currently played and/or additionally provide a different game, the main gaming server 422 can effectively manage the loading and/or unloading of various individual gaming components for the gaming machines and/or various other gaming devices for the gaming environment depicted in FIG. 4B.

By way of the example, the player may effectively request that the main gaming machine 428 provide a different game than what may be currently available for play on the gaming machine 428 or provide a second and/or third game n addition to the game currently being played. The request for a game 429 can be provided to the main gaming server 422. Subsequently, the main gaming server 422 can obtain the differential gaming data 439 that indicates what individual gaming components need to be loaded into memory for the execution of the requested game. By way of example, the gaming machine 428 can provide the game 1a instead or in addition to the game 2c previously provided or being currently provided. In that case, the main gaming server 422 can provide the gaming components needed by the gaming machine 428 to provide the game 1a. Alternatively, the gaming server 422 can send an indication to the gaming machine 428 to effectively identify the individual components that are needed. These components can be stored and be available from the local database 442. In that case, the gaming machine 428 can be configured to load them directly from the database 412. Similarly, the gaming server 422 can effectively control the loading operations of various other gaming machines and/or gaming devices operated by the gaming environment 420. It should be noted that the main database 440 can, for example, be provided as a gaming terminal data repository and information distribution system disclosed in the U.S. patent application Ser. No. 10/785,526, entitled "GAMING TERMINAL DATA REPOSITORY AND INFORMATION DISTRIBUTION SYSTEM." As noted in the U.S. patent application Ser. No. 10/785,526, a gaming terminal data repository may be used to store game software components, game software component information and gaming transaction information for a plurality of gaming terminals owned by a plurality of gaming entities. The repository may store the game software component information and the gaming transaction information in a database partitioned according to the different gaming entities in a manner allowing a game software component configuration of a particular gaming machine to be easily analyzed and modified. Using various update triggers, game software components for gaming terminals connected to the gaming terminal data repository may be automatically updated. The gaming machines, configured or designed to receive game software components from the repository, may present game play using a combination of game software components residing on the gaming machine and the game software components received from the repository.

Figure 4C:
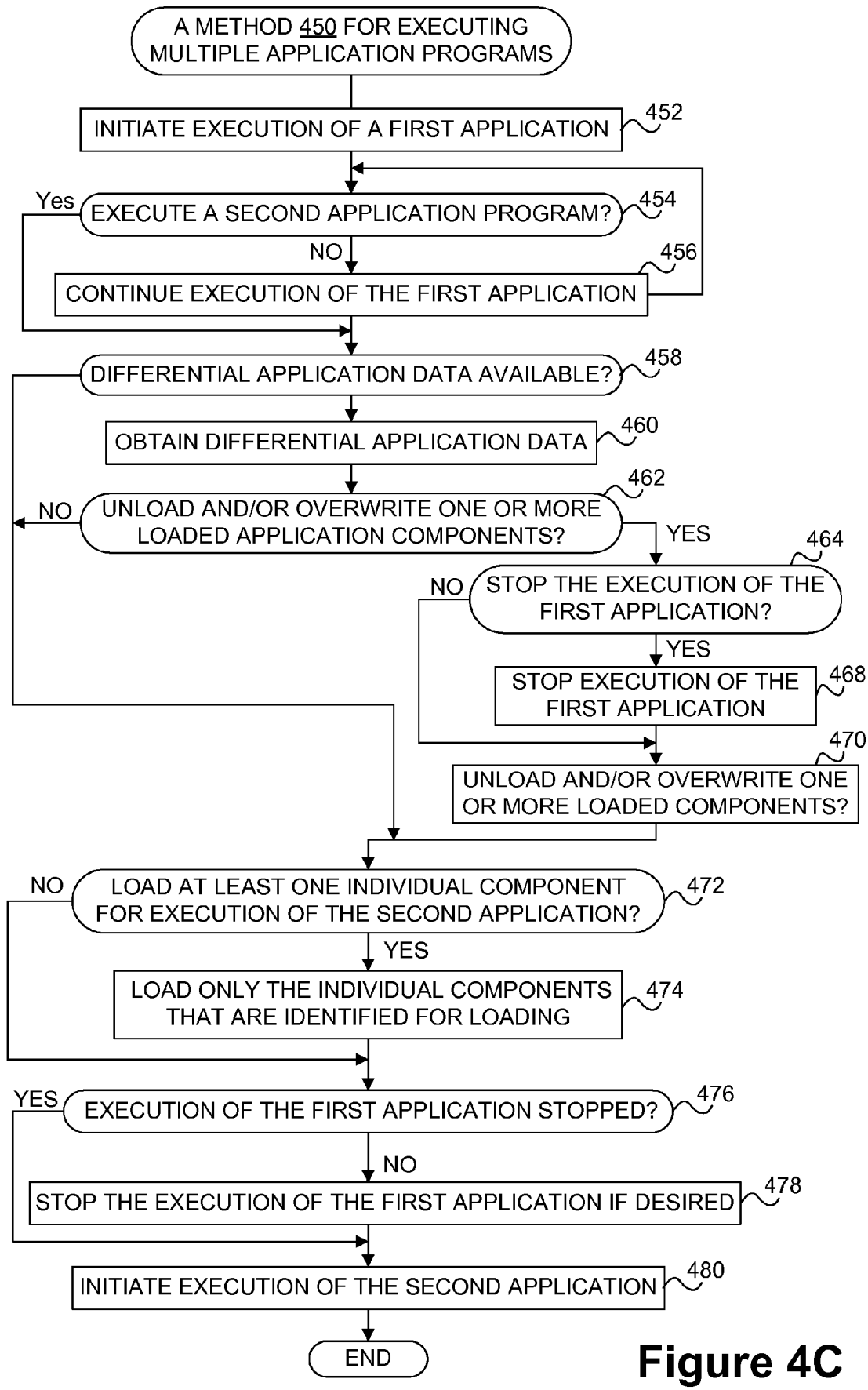
FIG. 4C depicts a method for executing multiple application programs in accordance with one embodiment of the invention.

FIG. 4C depicts a method 450 for executing multiple application programs in accordance with one embodiment of the invention. Referring to FIG. 4C, initially, the execution of a first application program is initiated 452. Next, it is determined (454) whether to execute a second application program. In effect, the execution of the first application can continue 456 if it is determined (454) not to execute the second application program. However, if it is determined (454) to execute the second application program, it is determined (458) whether the differential application data pertaining to the execution of the second application program is available (e.g., stored). If it is determined (458) that the differential application data is available, the differential application data is obtained (460). Next, it is determined, based on the differential application data, whether to unload and/or overwrite one or more individual application program components that are currently stored and/or loaded in the memory. If it is determined (462) to unload or overwrite one or more application program components, it is determined (446) whether to stop the execution of the first application. It will be appreciated that the two application programs can be executed concurrently. On the other hand, the execution of the first application program can be terminated on behalf of the second application program.

As such, the execution of the first application can stop (468) before unloading and/or overwriting the application program components that are needed for execution of the first application program. Accordingly, the execution of the first application program can be stopped (468) before one or more application program components are unloaded and/or overwritten (470). Subsequently, it is determined (472) based on the differential application data whether to load at least one individual application program component of the second application into memory for execution of the second application. If it is determined (472) to load at least one application program component, one or more components are loaded based on the differential application data. In other words, only the application program components that are identified for loading are loaded (474).

Subsequently, it can be determined (476) whether the execution of the first application program has already stopped. If it is determined (476) that the execution of the first application program has not stopped, the execution of the first application can be stopped (478) if desired before the execution of the second application is initiated (480). In other words, the execution of the first application is stopped (478) if it is determined not to execute the first and second applications concurrently. The method 450 ends following the initiation (480) of the execution of the second application. It should be noted that the determining (472) of whether to load at least one individual component for the execution of the second application program can determine that all the components needed for the execution of the second application program are already stored in memory and available for execution. As such, there may not be a need to load any additional application program components into memory and the loading (474) can be bypassed. Generally, the exemplary operations depicted in FIG. 4C can be performed at different times and/or exchanged with other operations. By way of example, the loading operation (470) may require determining whether there is enough memory available prior to loading any additional components into memory. As such, the execution of the first application may have to be terminated prior to the loading (474).

Figure 5A:
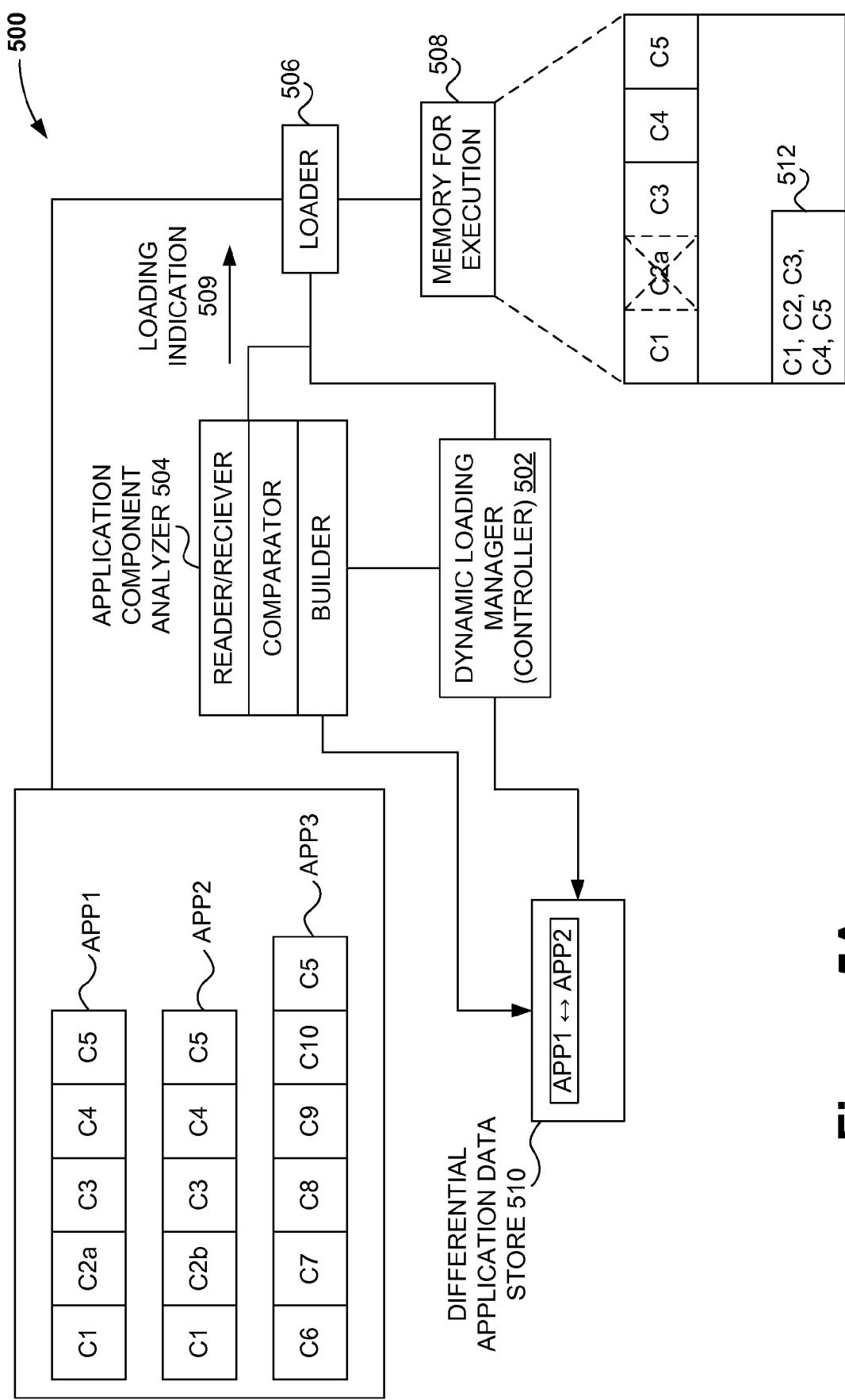
FIG. 5A depicts computing system configured and/or operable for executing multiple application programs in accordance with another embodiment of the invention.

FIG. 5A depicts computing system 500 configured and/or operable for executing multiple application programs in accordance with another embodiment of the invention. Referring to FIG. 5A, a dynamic loading manager (controller) 502 can effectively manage and/or control the loading operations of the computing system 500 in a dynamic manner. More specially, the dynamic loading manager 502 can determine during runtime of a first application program (application 1) whether one or more application program components should be loaded into the memory 508 for execution of the second application program (application 2). The dynamic loading manager 502 can, for example, receive a request and/or indication for switching the execution from the first application program to the second application program. Consequently, the dynamic loading manager 502 can determine whether the differential application data pertaining to the transition from the first to second application program is available.

By way of example, the differential application data pertaining to this transition may be available in the differential application data store 510. Accordingly, the dynamic loading manager 502 can use the differential application data to effectively manage the loading of one or more application program components needed for the execution of the second application program. As such, the dynamic loading manager 502 can, for example, determine that only individual application component C2b of the second application needs to be loaded into memory 508 in order to execute the second application program since the other components of the second application program (C1, C3, C4 and C5) are determined to be loaded as a result of the execution of the first application program. In this way, the transition from the first to the second application program can be achieved. In a similar manner, both of the first and second application programs can be executed concurrently.

It will also be appreciated that the dynamic loading manager 502 can be configured to function without differential application data.

More particularly, the dynamic loading manager 502 can effectively use an application component analyzer 504 in order to provide loading indications to the loader 506. By way of example, when the dynamic loading manager 502 receives a request and/or indication for switching the execution from the first to the second application program, the dynamic loading manager 502 can effectively request that the application component analyzer 504 determine the difference between the individual components of the first and the second application programs. The application component analyzer 504 can, for example, function in a similarly manner as described above to analyze the individual application program components of the first and second application programs. As such, loading of the application program component needed for the execution of the first ad/or second application program can be determined based on the analysis performed by the application component analyzer 504. For example, the application program component analyzer 504 can determine that only the application program that the individual application component C2b needs to be loaded in order to switch the execution from the first to the second application program, and so on. A loading indication 509 can be provided to the loader 506 to that effect. In this way, application can be analyzed at runtime in a dynamic manner with reliance of differential application data.

However, it should be noted that the computing system 500 can be configured to effectively generate differential application data for later use (i.e., subsequent execution). In other words, differential application data can be generated based on the analysis performed by the application component analyzer 504 and stored in the storage 510. By way of example, the differential application data can effectively describe the transition between first and second application program not already available in the differential store 510 based on the analysis performed by the application component analyzer 504. It will be appreciated that the application component analyzer 504 and the dynamic loading manager 502 can effectively perform these operations at runtime without interfering with the execution of the application program(s).

It will also be appreciated that the computing system 500 can effectively maintain a list 512 of individual application program components that are stored in the memory 508. In addition, the list 512 can effectively indicate the location of the application components stored in the memory to facilitate unloading and/or overwriting them when needed. By way of example, the list 512 can effectively provide an address range for the application program component C2a to allow overwriting and/or unloading it when needed. It should also be noted that other criteria can also be considered in determining whether to load the application program components individually. By way of example, even though differential application data may indicate that only a number of application program components are needed, it may be determined based on other system parameters and/or requirements that it would be more effective to load, for example, a third application program in its entirety rather than loading several application program components into memory 508 individually.

Figure 5B:
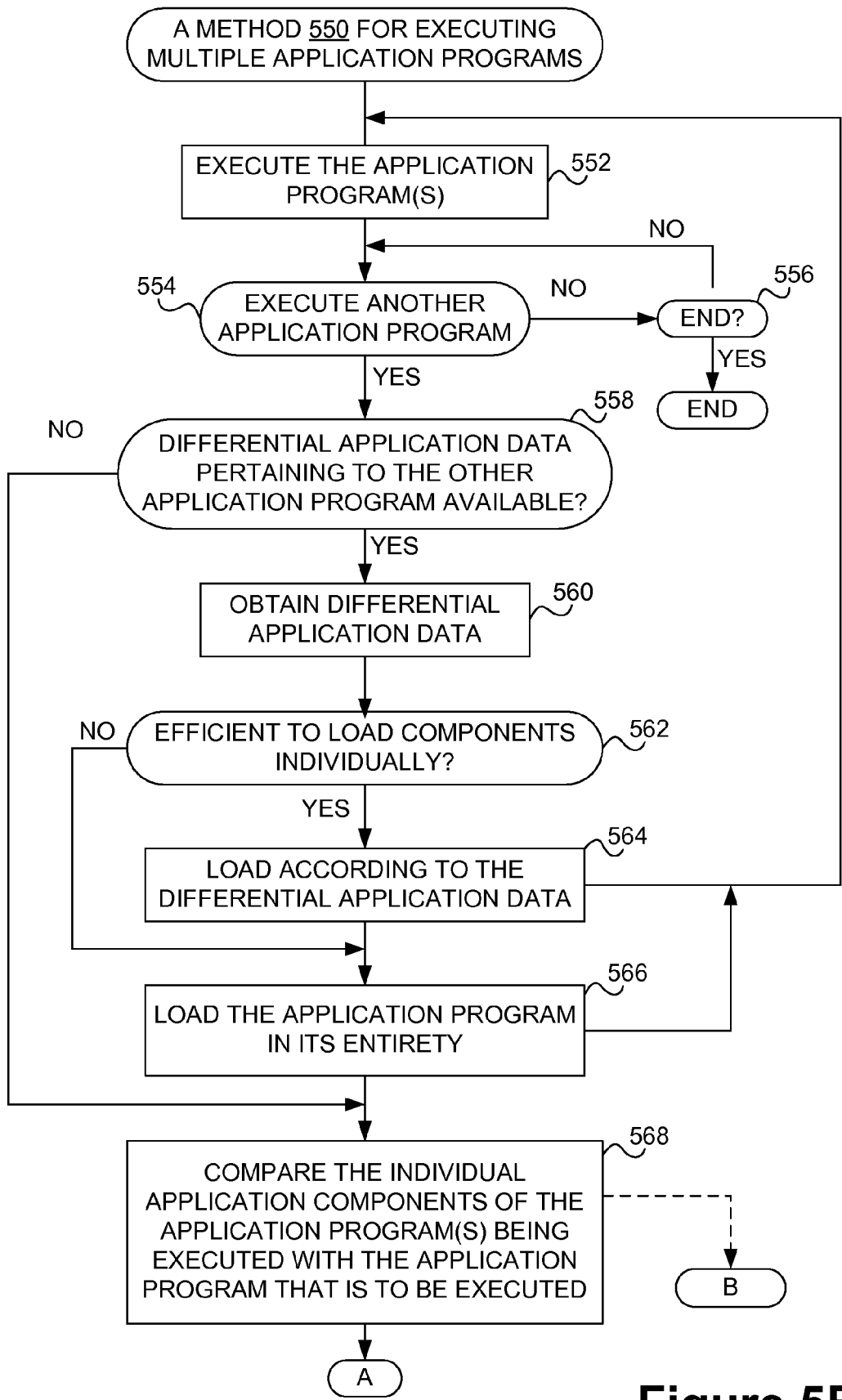
FIGS. 5B and 5C depict a method 550 for executing multiple application programs in accordance with one embodiment of the invention.
Figure 5C:
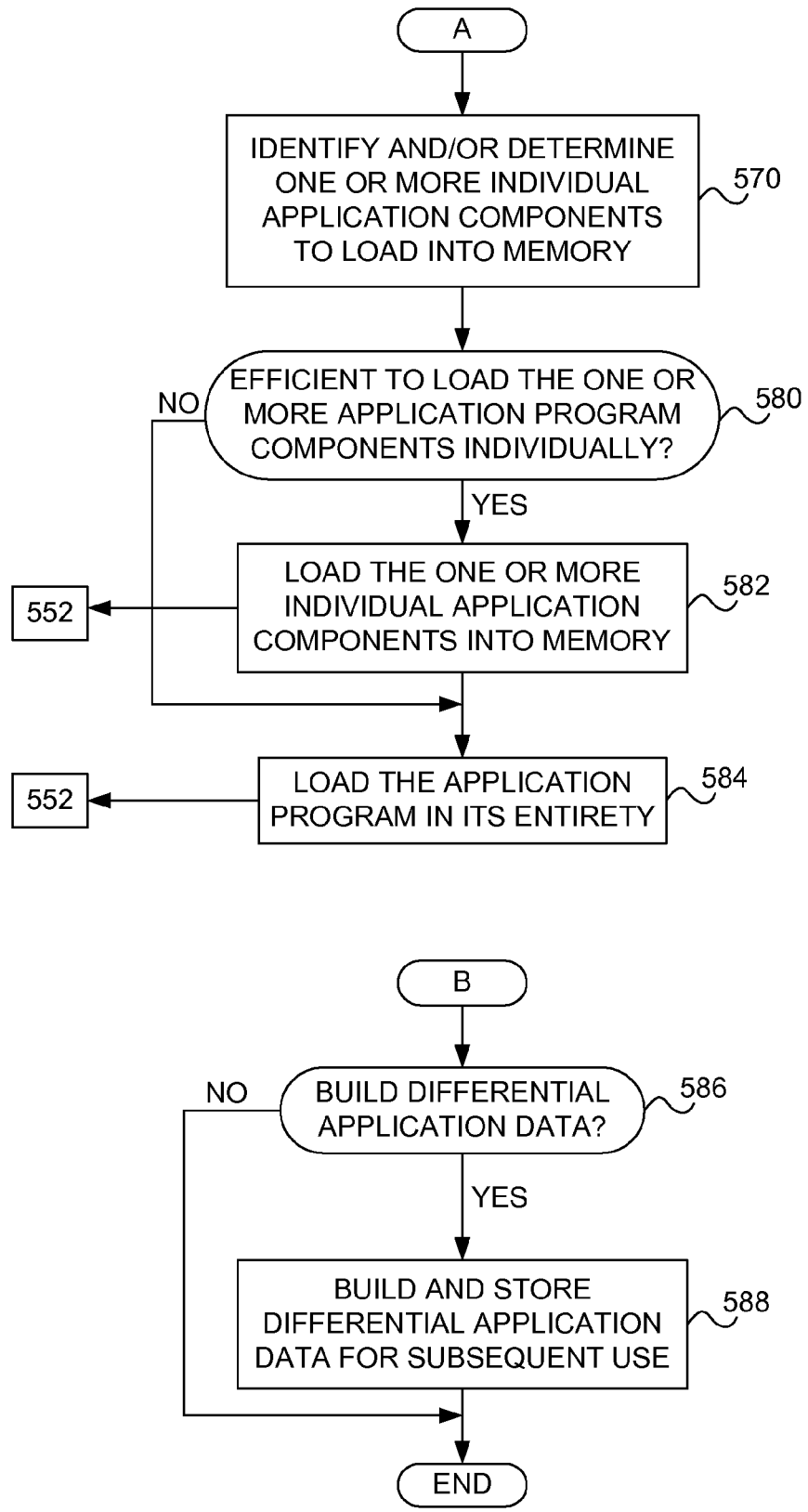

FIGS. 5B and 5C depict a method 550 for executing multiple application programs in accordance with one embodiment of the invention. Initially, an application program is executed (552). Next, it is determined (554) whether to execute another application program. In effect, a first application program can be executed (552) until it is determined (554) to execute a second application program or it is determined (556) to end the method 550. It should be noted that the execution can switch from a first to a second application program or both application programs can be executed concurrently. If it is determined (554) to execute another application program, it is determined 558 whether the differential application data pertaining to the other application program is available. If it is determined (558) that the differential application data is not available (558), the differential application data is obtained (560). Thereafter, it is determined (562) whether it is efficient to perform the loading of the application programs in accordance with the differential application data. In other words, it is determined (562) whether it is efficient to load the application components individually as identified by the differential application data. This determination (562) can, for example, be made based on the capabilities of the system. Accordingly, if it is determined (562) that it is efficient to load the application program components, one or more application program components are loaded (566) pursuant to the differential application data. However, if it is determined (562) that it is not efficient to load the application program components individually, the application program is loaded (566) in its entirety into memory for execution. In any case, the method 550 can proceed to execute (552) the application program after the application program components are loaded individually (564) or the application program is loaded in its entirety (566). It should be noted that the executing (552) of the application program can execute the application instead or in addition to one or more applications being currently executed. After, the executing (552) of the application program, the method 550 can proceed in a similar manner as discussed above.

On the other hand, if it is determined (558) that the differential application data is available, the individual application program components of the application program(s) currently being executed is compared (568) to the individual application components of the application program that is to be executed. Referring to FIG. 5C, one or more application program components can be identified and/or determined (570) for loading into memory for execution of the application program. It should be noted that the one or more application program components need to be loaded into memory before the application program can be executed. Again, it can be determined (580) whether if it is efficient to load the one or more identified application program components individually, and one or more components can be loaded (582) accordingly. If it is determined that it is not efficient to load the one or more components individually, the application program can be loaded (582) in its entirety into memory for execution. In any case, after all the application program components needed for the execution of the application program are loaded into memory, the application program can be executed (552). It will be appreciated that after the comparing (568) of the individual application components, a separate process can be initiated to determine (586) whether to build differential application pertaining to the application program. As a result, differential application data can be built and stored (588). The differential application data can be used at a later time when the execution of the application program is desired. In this way, subsequent execution can benefit from the analysis performed when the application program components are compared (568).

Figure 6:
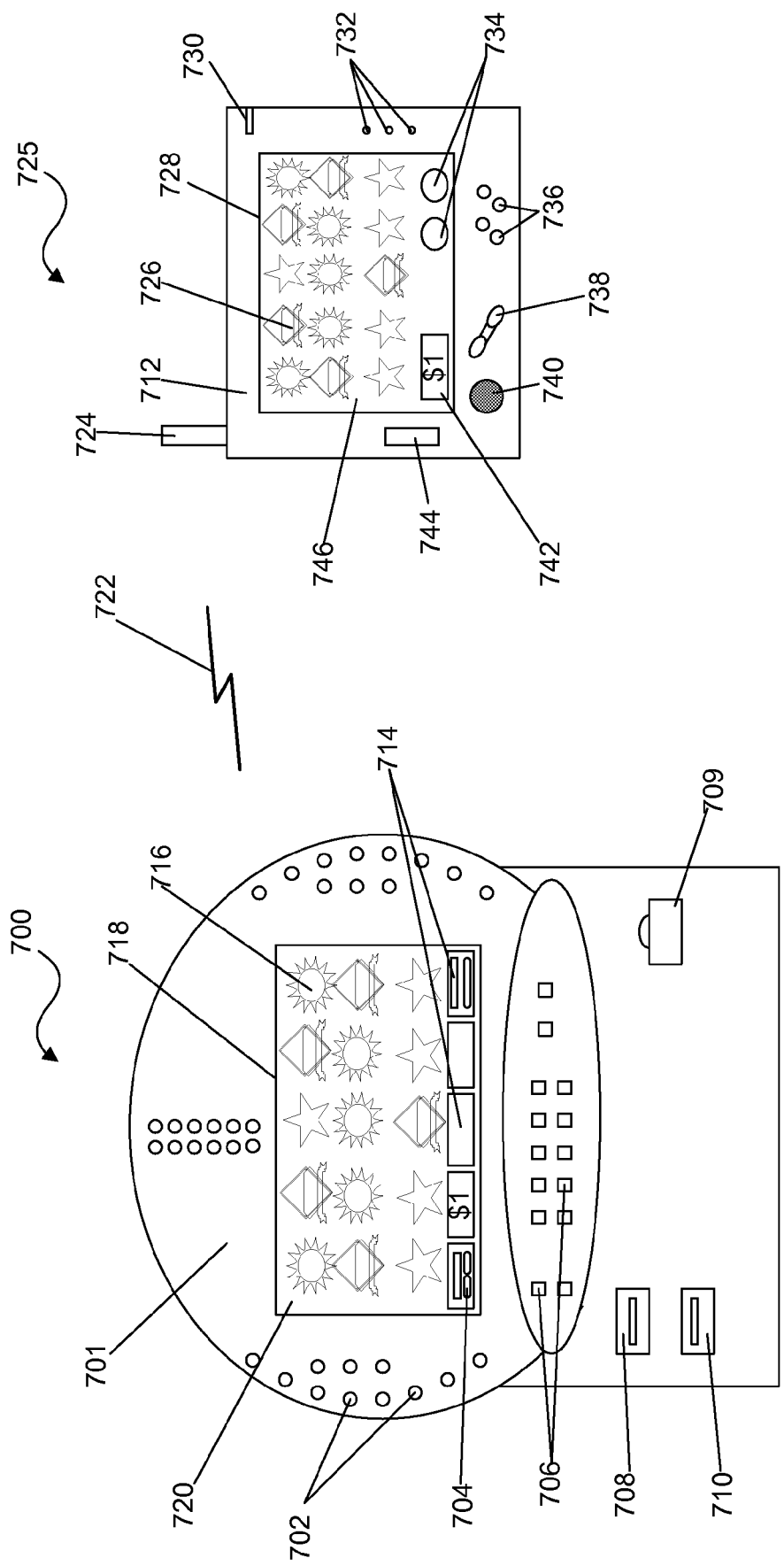
FIG. 6 is block diagram of a gaming machine in communication with a wireless game player.

It should be noted that a wireless gaming device can be used to play a game in a gaming environment that uses the authentication techniques of the invention. FIG. 6 is block diagram of a gaming machine 700 in communication with a wireless game player 725. The wireless game player 725 is used as a remote extension to extend the game playing capabilities of gaming machine 700. Game outcomes for games of chance generated using licensed and regulated gaming software executed on the gaming machine 700 may be presented on the wireless game player 725 at remote locations from the gaming machine 700. Thus, a game generated on a gaming machine 700 may be presented on a display 718 located on the main cabinet 701 of the gaming machine and played using input mechanisms located on the main cabinet of the gaming machine. In addition, the game generated on the gaming machine may be presented on a display 728 located on a wireless game player in communication with the gaming machine and played with input mechanisms located on the wireless game player.

As an example, a game 716 may be presented on a display 718 located on gaming machine 700. The game 716 may be played using input mechanisms, such as input buttons 706 or touch screen interface buttons 704. The touch screen interface buttons 704 are activated using a touch screen 720 located over the display 718 of the gaming machine 700. Further, a game 726 may be presented on display 728 located on the wireless game player 725. The game 726 may be played using input mechanisms located on the wireless game player 725, such as 738 and 736 or touch screen interface buttons 734. The touch screen interface buttons 734 are activated using the touch screen 746 located over the display 728.

The game logic for a game presented on display 718 or display 728 is stored within the main cabinet 701 of the gaming machine 700. The game logic, which is typically regulated gaming software, is executed by a master gaming controller located within the main cabinet 701 of the gaming machine 700. A particular game executed by the master gaming controller may be presented on display 718 or, when the wireless game player 725 is activated, on display 728. When the same game is presented on display 718 or on display 728, the graphical presentations of the game may vary between the displays because of hardware differences. For instance, display 718 may by larger than display 728 allowing for higher resolution graphical output on display 718 as compared to display 728.

While playing a game 726 on the portable wireless game player 725, a player may move throughout the areas of a casino where wireless game play is enabled. For instance, a player may be able to play the game 726 with the wireless game player 725 in a restaurant, a keno parlor or a sports book. The player's position does not have to remain static while playing the game 726 on the wireless game player 725 and the player may be actively moving while games are played on the wireless game player 725.

When a game is played on the wireless game player of the present invention, such as 725, all random number generation (RNG) events, game outcomes, meter information, game related information, and all cash transactions are generated and maintained in the licensed (controlled) gaming machine (e.g. 700), and not the wireless game device. Thus, the wireless game player 725 may be considered a remote extension of the gaming machine's 700 display and input mechanisms. With a gaming machine with a remote extension, the gaming machine may operate in both a local mode and a remote mode. In the local operational mode, game play is presented using the display and input mechanisms located on the gaming machine. In the remote operational model, game play is presented using the display and input mechanisms located on the wireless game player. These two operational modes are described as follows.

During local game play on a gaming machine, a player may input money or indicia of credit into the gaming machine, indicate a wager amount, and initiate a game play. For example, to play the slot game 716 on gaming machine 700, a player may deposit money or indicia of credit using the bill validator 708, the card reader 710 or the coin acceptor 709. Status information 714 for the game, such as a game denomination and available credits may be displayed on display 718.

Next, using input buttons 706 and touch screen interface buttons 704, the player may make a wager and initiate the game. The gaming machine determines a game outcome and then presents the game outcome to player on the display 718. For instance, after a slot game has been initiated, the video gaming machine calculates the final position of the reels (e.g. the game outcome), the reels on display 718 spin and then stop at pre-determined position. Based on the pre-determined outcome calculated by the master gaming controller, an award may be presented to the player. As another example, after a card game has been initiated, the video gaming machine 700 calculates a sequence of cards to be dealt to the player and card hands are dealt on the display 718. During the card game play, the player may use input mechanisms on the gaming machine 700 to hold or discard cards. After the card game is complete, an award may be presented to the game player.

The games presented on the gaming machine 700 may be enhanced by additional features. Light patterns, such as from lights 702, and sounds may be generated on the gaming machine 700 to enhance the game outcome presentation. In addition, during certain game events, a bonus game may be presented to the game player.

During remote game play on a gaming machine using a wireless game player such as 725, a player may input money or indicia of credit into the gaming machine, activate a wireless game player, indicate a wager amount on the wireless game player and initiate a game play on the wireless game player. For example, to play the slot game 726 on gaming machine 700 using the wireless game player 725, a wireless game play session is requested by the player. A wireless game play session may include one or more game plays on a wireless game player 725 connected to the gaming machine 700 via a wireless communication link 722. The wireless game play session request by the player may be made using an input mechanisms located on the gaming machine.

Prior to beginning, the wireless game play session, a player may be required to deposit money or indicia of credit to in the gaming machine in communication with the wireless game player. The deposited credits may be used during the wireless game play session. For instance, using the bill validator 708, the card reader 710 or the coin acceptor 709 located on the gaming machine 700, the player may provide an initial amount of credits to be used for a wireless game play session using the wireless game player 725. During game play on the wireless game player, a player wagers a certain amount of credits per game. Depending on the outcome of a particular game, the number of credits available for game play may be decreased or may be increased.

After a game player has used all of their credits during a wireless game play session and the player desires to continue the wireless game play session, the player may be required to return to the gaming machine to add additional credits. In other embodiments (See FIG. 8), a card reader or other input device may be attached to the wireless game player 725 and used to add credits to the gaming machine 700. For instance, a player may be able to enter a credit card number or debit card number and transfer funds to the gaming machine to be used as game credits via a touch screen interface on the wireless game player 725. Further, the wireless game player may include a card reader for scanning a magnetic strip on the debit card or credit card.

After establishing game credits on the gaming machine, the wireless game player 725 is activated. In some embodiments, authentication and verification of the user of the wireless game player is performed. For example, to enforce age restrictions imposed by a jurisdiction, the user may be verified and authenticated to use the game player. The wireless game player may have a biometric sensor (not shown) such as a fingerprint sensor. As part of the authentication process, the player may be asked to place their finger on the sensor located on located on the wireless game player. The fingerprint image is sent back to the controller in the machine for comparison. As another example, the wireless game player may include a smart-card reader that reads biometric smart cards (cards having a built-in fingerprint sensor). The smart card has all the personal information of the casino guest. Thus, the authentication could occur directly at the wireless game player. A description of a finger print reader as an identification device is provided in U.S. Pat. No. 6,488,585, which is incorporated herein in its entirety and for all purposes. Other types of verification methods such as a PIN number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

For security, the wireless game player has an encrypted serial number (code), which is used to verify and authenticate the wireless game player. For additional security, an electronic key may be used with the device. With an electronic key system, the wireless game player device cannot be activated until the key is inserted into a receptacle on the game player. In addition, the wireless game player may have a small GPS (Global Positioning System) device to verify location of the device. Position verification may be used to insure the wireless game player is used only in legal gaming areas of the casino and to track lost or stolen devices. When the gaming machine detects that the wireless game player is in a restricted area, it may discontinue communications with the wireless game player. Further, the wireless game player may have an RF capacitive device built into the wireless game player. RF capacitive devices are often used in retail stores to prevent theft. When the wireless game player is passed through a protected doorway, an alarm may be sounded even when the power is off to the wireless game player. Other security features may be used on the wireless game player and are not limited to electronic keys, GPS sensors or RF capacitive devices described above. Verification and authentication may be required to start every wireless game play session. Further, there may be a non-play time limit. Once this time is exceeded, a verification and authentication cycle or process must be performed. The verification and authentication cycle may be performed for the player and the wireless game player, for only the player or for only the wireless game player. As another example, authentication and verification may be required after a certain number of games played on the gaming device or may be even be required at random intervals. When verification and authentication requirements are not satisfied during a wireless game play session, the game play session will typically be terminated.

In one embodiment, after the wireless game player is activated 725, the input mechanisms, such as the touch screen 720 and the input buttons 706, built into the gaming machine 700 are deactivated and a wireless game play session may begin. The display 718 on the gaming machine 701 may display an "out of order" message, an "operator" message or the display 718 may be blank to indicate the gaming machine is unavailable for game play. During remote game play on the wireless game player 725, gaming information necessary to present the game on the wireless game player, such as a graphical presentation of game outcome and meter information, is generated on the gaming machine 700 are transmitted to the wireless game player via wireless communication 722. The mathematical methods used to generate the game outcomes remain on the gaming machine 700. Further, gaming information required by the gaming machine 700 to the determine the game outcome, such as signals from input mechanisms located on the wireless game player, are transmitted from the wireless game player 725 to the gaming machine 700 via wireless communication 722.

During game play on the wireless game player 725, status information 742 for the game 726, such as a game denomination and available credits may be displayed on display 728. The status information 742 and the game 726 displayed on the wireless game player 725 may appear similar to what is displayed on the gaming machine 701 but is not necessarily identical to what is displayed on the gaming machine 700. Next, using input buttons, such 734, 736 and 738, the player may make a wager and initiate the game. In one embodiment of the present invention, the touch screen interface buttons 734 may be based on a web-browser interface.

After a game has been initiated on the wireless game player 725, via antenna 724, a wireless communication 722 containing the wager and initiate game inputs is sent to the gaming machine 700. In response, to the wager and the initialization of a game, the gaming machine 700 generates a game outcome including an award and possibly a bonus game. Instructions for displaying the game outcome and bonus game are sent in one or more wireless communications 722 to the wireless game player 725. The one or more wireless communications may be a series of information packets. The format of the information packets will vary according to the wireless communication standard used. Details of a wireless network for providing wireless communications is described with respect to FIG. 9. To illustrate the play of a particular game, a slot game and a card game are described. However, the present invention is not limited to these games as nearly any type of game that can be played on a video gaming machine may also be played on the wireless game player 725. When a slot game 726 has been initiated on the wireless game player 725, the gaming machine 700 calculates the final position of the reels (e.g., the game outcome). The gaming machine may send instruction to the wireless game player to spin the reels on display 728 spin and then stop the reels at a pre-determined position. Based on the final position of the reels calculated by the master gaming controller located on gaming machine 700, an award may be presented to the player. In addition, during certain game events, a bonus game may be presented to the game player as part of the slot game. As another example, after a card game has been initiated on the wireless game player 725, the video gaming machine 700 calculates a sequence of cards to be dealt. The gaming machine 700 sends wireless communications 722 to the wireless game player 725 indicating card hands to be dealt on the display 728. During the card game play, the player may use input mechanisms on the wireless game player 725 to hold or discard cards. After the card game is complete, an award may be presented to the game player. A bonus game may also be incorporated into the card game.

When a customer does not wish to use the wireless game player 725 anymore, the customer can terminate the wireless game play session using the touch screen 746 and deactivate the wireless game player 725. As described above, the wireless game player 725 may automatically terminate a wireless game play session and deactivate itself after a period of inactivity. After roaming with the wireless game player 725, the customer may return to the gaming machine providing the wireless game play session and wish to resume play on the main display of the gaming machine. In this case, the customer may depress a "return" button on the wireless game player 725 and after a verification cycle the player can begin playing at the gaming machine again.

The games presented on the wireless game player 725 may be enhanced by additional features. For instance, light patterns and sounds from the audio output 740 may be generated to enhance the game outcome presentation and add excitement to the games played on the wireless game player 725. Further, the wireless game player may include an audio output interface for connecting headphones. As part of a game outcome presentation, sounds may be transmitted through the audio output interface to headphones worn by the game player.

Details of the wireless game player hardware are now described. The wireless game player 725 is generally a hand-held device. It consists of a housing 712, display 728, touch screen 746, switch panel 744, battery, wireless communication interface, and controller. In one embodiment of the present invention, a modified DT Research WebDT pad (DT Research, Inc., Milpitas, Calif.) is used as a wireless game player. However, the present invention is not limited to the DT research WebDT pad as other hand-held wireless devices such as personal digital assistants (PDA) may also be used.

In one embodiment, the wireless game player may be approximately 10.5×9.5×1.0 inches in size, weigh 3 pounds and use a 10.4 inch color LCD touch screen display. Typically, an 8 inch to 10.4 inch display provides a sufficient viewing area without reducing the size of the character fonts to a point where they are unreadable by most players. The touch screen (sensor) 746 is overlaid on the displayable surface of the LCD 728. Other display technologies can be used instead of LCD, plus some display technologies will incorporate a built-in touch screen (internal vs. external). To activate the touch screen 746, a stylus 730 may be used, but most people will use their fingers.

Audio is available via the small built-in speaker 740 or an external headset. Lighting schemes, such as arrays of LEDs, may be added to the wireless game player 725 to provide visual effects and to communicate status information to a game player. Status information, such as a battery level and connection status, may be provided by the status lights 732. The layout and number of the input buttons, including 738 and 736, is variable. In FIG. 6, the configuration of the input buttons on the gaming machine 700 and wireless game player are different. In one embodiment of the present invention, the input buttons on the wireless game player 725 may be configured in a manner similar to input buttons located on the gaming machine. Further, other devices on the wireless game player, such as the audio output 740, the status lights 732, the antenna 724 and the on/off switch 744 may be located at other locations on the housing 712 depending on the design of the wireless game player.

In one embodiment, the battery will last 5 hours between charging. Charging of the wireless game player may be accomplished by setting the wireless game player in a special storage cradle. The cradles may be in the form of storage bins located in a special area, located at the gaming machine or built as holders located on a desk, counter or table. For instance, a storage cradle for charging the wireless game player may be located in a keno parlor, restaurant tables or sports book. When the wireless game player is placed in a storage cradle it may used while being charged.

The wireless game player 725 can, for example, use an IEEE 802.11b compliant wireless interface. It is a 2.4 Ghz Direct Sequence Spread Spectrum radio system. It has a range of up to 330 ft (inside) from any access point. The data rate is 11 Mbps. IEEE 802.11b is a commonly used radio standard. Other exemplary wireless standards that may be used include IEEE 802.11a, IEEE 802.11x, hyperlan/2, Bluetooth, IrDA, and HomeRF.

In the example above, local gaming and remote gaming on gaming machine 700 has been described in a mutually exclusive manner. Therefore, when local gaming is enabled, remote gaming is disabled and when remote gaming is enabled, local gaming is disabled. However, the present invention is not so limited. Gaming machines that support only remote gaming and not local gaming may be used with the present invention. These gaming machines (see FIG. 10) may be located away from the casino floor. Further, a gaming machine may support simultaneously a plurality of remote gaming devices for game play and not just a single remote gaming device. Finally, gaming machine may be used that simultaneously provide both remote game play and local game play. For instance, one game player may use a gaming machine for local play while another game player is using a wireless game player connected to the gaming machine to play remotely.

Figure 7:
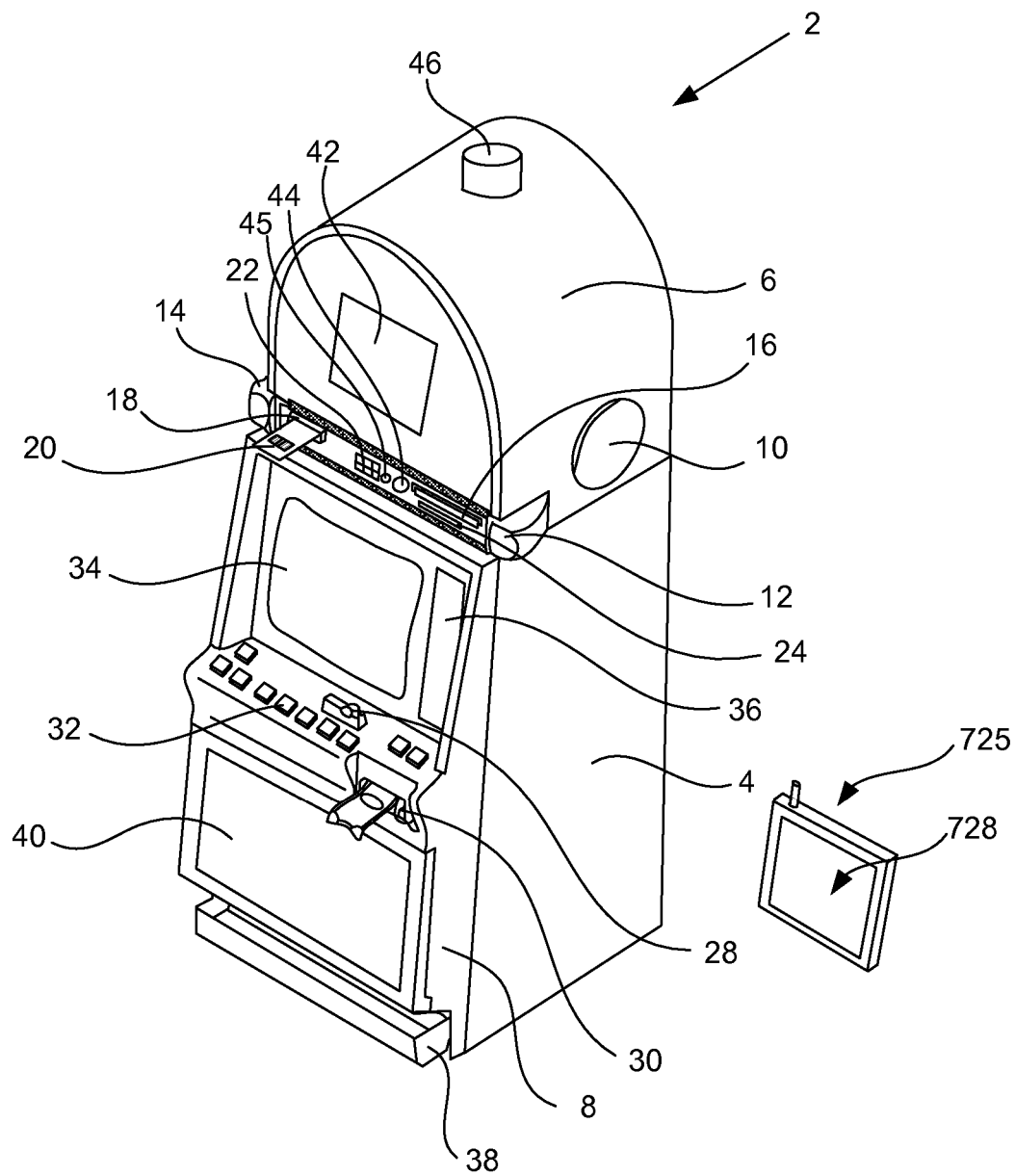
FIG. 7 is a perspective drawing of a gaming machine having a top box and other devices

In FIG. 7, another video gaming machine 2 suitable for use with the present invention is shown. Referring to FIG. 7, more details of a gaming machine as well as additional gaming services that may be provided with a gaming machine providing remote game play sessions are described. For instance, player tracking services may be provided on gaming machines of the present invention and player tracking points may be accumulated during a wireless game play session. Further, using a player tracking device located on a gaming machine, a player may be able to request a wireless game player for use in a wireless game play session.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor. In addition, the gaming machine 2 is designed to communicate to the wireless game player 725 with display 728. The wireless game player 725 effectively provides a remote extension to gaming machine 2.

Figure 8:
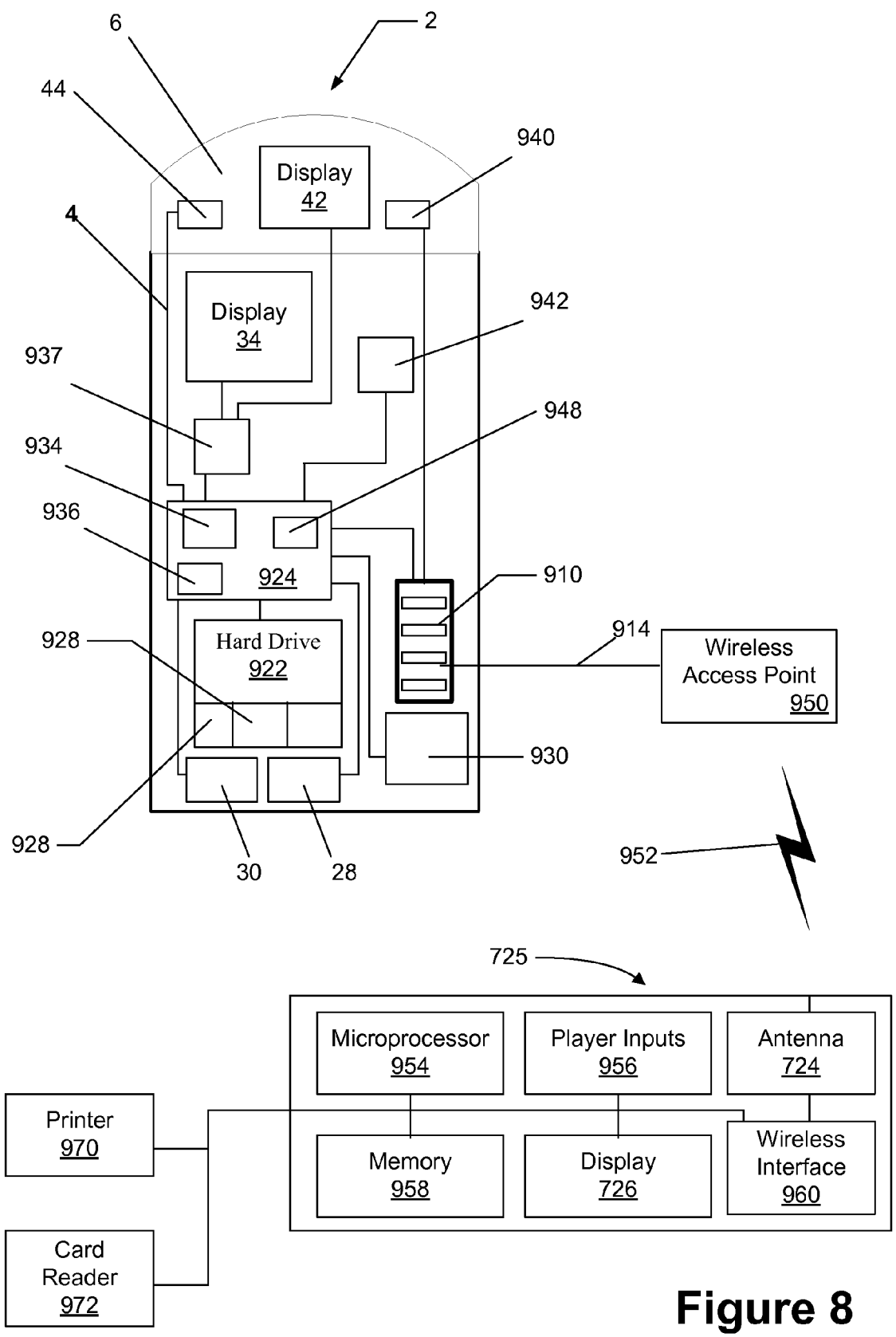
FIG. 8 is a block diagram of the internal components of a gaming machine and internal components of a wireless game player.

Typically, after a player has initiated a game on the gaming machine, one purpose of the main display monitor 34, the second display monitor 42 or the remote display 728 is the visual display of a game outcome presentation, including bonus games, controlled by a master gaming controller 924 (FIG. 8). Also, the main display monitor 34, the second display monitor 42 and the remote display 728 may also be utilized to display entertainment content independent of the game outcome presentation. For example, broadcast events, including television programming, may be provided to the main display monitor 34, the secondary display monitor 42 or the remote display 728. The broadcasts events may be sent to the gaming machine 2 via a cable link or other suitable link from outside of the gaming machine. All or some subset of the programming provided by a television broadcaster may be displayed as entertainment content on one or more of the video displays.

Television programming content of particular interest to casino operators and game players may include, for example, sporting events, talk shows, game shows, soap operas, advertisements, situation comedies, etc. In addition, broadcasts of competitive events on which the player can wager may be displayed. For example, dog racing or horse racing events may be displayed as content on the remote display 728. In such events, typically, there is a rather long down time between races. During this period, the player may play the wireless game player 725 connected to the gaming machine. Also, the television programming entertainment content may be displayed while a player is engaged in playing a game on the wireless game player 725 or between games. Similarly, the entertainment content may include information available on the Internet, including the World Wide Web, for more technologically sophisticated players.

Returning to the gaming machine in FIG. 7, the information panel 36 may be a back-lit, silk screened glass panel with lettering to indicate general game information including, for example, the number of coins played. The bill validator 30, player-input switches 32, video display monitor 34, and information panel are devices used to play a game on the game machine 2 including the wireless game player 725. The devices are controlled by a master gaming controller (see FIG. 8), housed inside the main cabinet 4 of the machine 2. Many possible games, including traditional mechanical slot games, video slot games, video poker, video pachinko, multiple hand poker games, video pai-gow poker, video black jack, video keno, video bingo, video roulette, video craps, video card games and general games of chance, may be provided with gaming machines of this invention. These games may be played using the wireless game player 725.

General games of chance refer to games where a player makes a wager on an outcome of the game. The outcome of the game of chance may be affected by one or more decisions may be the player. For instance, in a video card game, the player may hold or discard cards which affects the outcome of the game.

The top box 6 houses a number of devices, which may be used to add features to a game being played on the gaming machine 2, including speakers 10, 12, 14, a ticket printer 18 which may print bar-coded tickets 20, a key pad 22, a florescent display 16, a camera 45, microphone 44 and a card reader 24 for entering a magnetic striped cards. The speakers may be used to project sound effects as part of a game outcome presentation. The keypad 22, the florescent display 16 and the card reader 24 may be used for to enter and display player tracking information. As another example, the player may enter playing tracking information and identification information using the card reader 24 and the main video display 34 where the main video display may be used as a touch screen to enter information. Player tracking information may be entered into the gaming machine before a player initiates a game on the gaming machine. Typically, the player's incentive to enter player tracking information into the gaming machine 2 is potential rewards related to the amount of a player's game play.

The top box also includes a candle 46. The candle is a light that may be activated by the master gaming controller on the gaming machine. In one embodiment, an antenna (not shown) may be installed in the candle. The antenna may be used to provide wireless game play sessions to one or more wireless game players in communication with the gaming machine 2 via the antenna.

In addition to enabling player tracking services, the key pad 22, the florescent display 16 and the card reader 24 may be used to enter identification information that enables a player to access entertainment content or receive personal messages on the gaming machine independent of a game play and game outcome presentation on the gaming machine 2. For example, a player may enter a personal identification number into the gaming machine 2 using the key pad 22 that allows the player to receive entertainment content such as viewing a movie or a broadcast event. As another example, after entering the personal identification number, the player may be allowed to receive a personal message indicating a table is ready at a restaurant in the casino or to receive a personal message containing information on a sporting event such as a score of personal interest to the player utilizing the gaming machine.

In one embodiment of the present invention, the player tracking services and related gaming service described above may be provided via a touch screen interface on the wireless game player 725. For instance, the wireless game player 725 may include a card reader for reading a player tracking card and player tracking identification information may be provided via a touch screen interface on the wireless game player. Further, the player may be able to access player tracking information using the wireless game player 725.

In addition to the devices described above, the top box 6 may contain different or additional devices than shown in the FIG. 7. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2. Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video, while others are designed for bar tables and have displays that face upwards. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 7, when a user selects a gaming machine 2, he or she inserts cash through the coin acceptor 28 or bill validator 30. Additionally, the bill validator may accept a printed ticket voucher which may be accepted by the bill validator 30 as an indicia of credit. Once cash has been accepted by the gaming machine, it may be used to play a game on the gaming machine. Typically, the player may use all or part of the cash entered into the gaming machine to make a wager on a game play. Depending on the amount of the wager on a game or for a fee, a player may be able to access various entertainment content sources for a length of time. For example, a wager on a game above a certain threshold amount may enable a player to watch a broadcast event or to access the World Wide Web for up to 5 minutes after each wager on the gaming machine 2. In addition, cash or indicia of credit entered into the gaming machine may be used to purchase entertainment content independent of a wager made on a game on the gaming machine. For example, for a 10 dollar fee, a player may view a movie on the gaming machine. While watching the movie on the gaming machine, the player may play games on the gaming machine 2 or the wireless game player 725 or just watch the movie.

During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

When a game is not being played on the gaming machine or during particular game operational modes, the player may select an entertainment content source using the above mentioned inputs where the entertainment content is independent of a game being played on the gaming machine. The entertainment content source may include, for instance, a CD player, an FM/AM tuner, a VHS player, a DVD player, a TV tuner, a musical jukebox, a video jukebox, a computer, a server and a media software application. It will be appreciated, however, that any information source may be utilized. Entertainment content from these sources may be selected and displayed on the wireless game player 725. For instance, a player may listen to music from the FM/AM tuner via headphones connected to the wireless game player.

Before playing a game, a player may select the video jukebox, which may contain a DVD player loaded with many DVDs, as the entertainment content source and preview a movie on at least one of the display screens on the gaming machine 2. The DVDs may be stored on the gaming machine 2 or in a central location separate from the gaming machine. The visual display of the output from the video jukebox may be viewed by the player on the main video display screen 34, the secondary video display screen 42 or the remote display 728. The sound for the movie may be projected by the speakers 10, 12 and 14 on the gaming machine or a player may listen to the movie through headphones. As described above, the wireless game player 725 may include an interface for audio output such as a headphone jack.

The game player may also use the player input switches 32, keypad 22, and other input devices to control a feature of the entertainment content. For example, when the entertainment content is a movie, the player input switches 32 and keypad may be operated to fast forward, stop or pause the movie. When the entertainment content is accessing the World Wide Web through a web-browser, the player input switches 32 and keypad may be used to operate the web-browser. Input switches, as described with respect to FIG. 6, on the wireless game player 725 may also be used to control these functions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, throbbing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. When a player is using the wireless game player 725, credits available during the wireless game play session are stored on the gaming machine. To redeem credits, for instance to receive a printed ticket voucher, the player may have to return to the gaming machine 700 or a printing station supporting communications with the wireless game player 725. In some embodiments of the present invention, a player may be able to electronically transfer credits to a remote account accessible by the player.

FIG. 8 is a block diagram of the internal components of a gaming machine 2 and a wireless game player 725. Components that appear in FIGS. 6 and 7 are identified by common reference numerals. A master gaming controller 924 controls the operation of the various gaming devices and the game presentation on the gaming machine 2. In the present invention, the wireless game player 725 is one of the gaming devices the master gaming controller 924 controls. The master gaming controller 924 may communicate with the wireless game player 725 via a wireless communication link 952. The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

As described above, in the present invention, the gaming machine may operate in a local operational mode where a game is presented on a local display screen, such as 34 or 42, a remote operational mode where a game is presented on the wireless game player 725 or combinations thereof. When the gaming machine 2 is in a local operational mode, using a game code and graphic libraries stored on the gaming machine 2, the master gaming controller 924 generates a game presentation which is presented on the displays 34 and 42. The game presentation is typically a sequence of frames updated at a rate of 60 Hz (60 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 936 located on the master gaming controller 924 or alternatively on the video controller 937. The gaming machine 2 may also include a video card (not shown) with a separate memory and processor for performing graphic functions on the gaming machine. Typically, the video memory 936 includes 1 or more frame buffers that store frame data that is sent by the video controller 937 to the display 34 or the display 42. The frame buffer is in video memory directly addressable by the video controller. The video memory and video controller may be incorporated into a video card which is connected to the processor board containing the master gaming controller 924. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 924, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 937 to one or more of the displays. For instance, a frame corresponding to a movie stored on the game partition 928 of the hard drive 922, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

When the gaming machine is in a remote operational mode and a game is presented on a display 726 of the mobile wireless game player 725, video frame data may be directly streamed from gaming machine 2 via the wireless interface 948 and wireless access point 950 to the wireless game player 725 via wireless interface 960. The video frame data may be stored in a memory 958 on the wireless game player 958 and then displayed on the display 725. The video frames sent to the wireless game player may be reduced in resolution and compressed to reduce the communication band-with necessary to transmit the video frames to the wireless game player 725.

In another embodiment, the video frames to present a game of chance may be rendered locally on the wireless game player 725. Graphical programs that allow a game to be rendered on the wireless game player may be stored in memory 958. For instance, the memory 958 may store a graphical program to render a slot game or a graphical program to render a card game. The memory 958 may store graphical programs for one or more games. For instance, the memory 958 may store graphical routines for a plurality of games supported by gaming machine 2. In one embodiment, the wireless game player 725 may be configured to allow different graphical programs for presenting different games to be downloaded into memory 958.

In other embodiments, the wireless gaming device may include a detachable memory and interface for the detachable memory. The detachable memory may store graphical applications for one or more games. Thus, to enable a particular game, a detachable memory storing graphical applications for the particular game may be inserted in the detachable memory interface on the wireless game player 725. The detachable memory may be in the form of read-only cartridges and may include a locking mechanism that prevents removal of the cartridge by the player. Thus, only authorized gaming personnel may be able to change a cartridge in the wireless game player.

The wireless game player may include a video card (not shown) to aid in the rendering process. The video card may include one or more graphical processing units that are used to render images to the display 726. The video card may be used to render 2-D graphics and 3-D graphics on the wireless game player 725. Graphical processing may also be performed by microprocessor 954 including 2-D and 3-D graphical rendering. Some images may be pre-rendered and stored on the wireless game player 725 and activated by a small string of commands from the gaming machine 2. Animations, such as reel rotation for a slot game, may be performed by routines on the wireless game player 725.

When the game graphics are rendered locally on the wireless game player 725, all of the game logic necessary to present the game of chance still resides on the gaming machine 2. Any switch or touch input necessary for game play on the wireless game player 725 (e.g., making a wager, initiating a game, holding cards, drawing cards, etc.) is transmitted 2 from the wireless game player 725 to the gaming machine 2. The gaming machine 2 executes gaming logic associated with the switch or touch inputs and sends the result back to the wireless game player 725. The wireless game player 725 verifies information sent from the gaming machine. In general, communication between the gaming machine 2 and the wireless game player 725 is encrypted. For any screen image or input involving the outcome of the game or betting, an additional level of transmit and receive data verification may be used by the wireless game player 725 and the gaming machine 2 to ensure the correct information is displayed on the wireless game player 725.

For illustrative purposes only, a series of commands between the gaming machine 2 and the wireless game player is described. The present invention is not limited to the commands described in this example. In response to input from player inputs 956 located on the wireless game player 725, the master gaming controller 924 may send a series of instructions to the wireless game player 725 that allow the game of chance to be rendered on display 726 of the wireless game player 725. The master gaming controller may also send instructions controlling audio output and other gaming devices on the wireless game player 725. For instance, for a slot game, the master gaming controller 924 may calculate symbol position, reel position, start and stop rotation for a number of reels. Then, the master gaming controller 925 may send one or more messages via the wireless communication link 952 to the wireless game player 725 with instructions such as 1) "render reels spinning", 2) "render reel 1 at position A", 3) "render reel 2 at position B", 4) "render reel 3 at position C", 5) "output audio B", 6) "display light pattern A," etc. The instructions may be processed and implemented by the microprocessor 954 using graphical software stored on the wireless game player 725.

In one embodiment, the wireless game player may be connected to a number of peripheral devices such as a printer 970 or a card reader 972. The printer 970 and the card reader 972 may communication with the wireless game player via a wire communication protocol such as serial, parallel, USB, Firewire or IEEE 1394. The peripheral devices, such as 970 and 972, may be controlled by the microprocessor 954 according to inputs received by the wireless game player and may also be controlled by the master gaming controller 924 on the gaming machine 2.

For gaming machines, an important function is the ability to store and re-display historical game play information. The game history provided by the game history information assists in settling disputes concerning the results of game play. A dispute may occur, for instance, when a player believes an award for a game outcome was not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. The game history information is used to reconcile the dispute.

During the game presentation, the master gaming controller 924 may select and capture certain frames to provide a game history. These decisions are made in accordance with particular game code executed by controller 924. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller. Details of frame capture for game history applications are provided in U.S. Pat. No. 6,863,608, which is incorporated herein in its entirety and for all purposes.

In general, the gaming machine 2 maintains transaction logs of all events and game play. In some embodiments, as described above, the gaming machine may generate and store video frames as a game history record. The video frames may correspond to gaming information displayed on the wireless game player 725. During a wireless game play session, when the wireless game player 725 stops responding to the gaming machine 2, the game presented on the wireless game player 725 stops. The wireless game player 725 may stop responding to the gaming machine 2 because the wireless game player 725 is out-of-area reception, a battery level is low on the wireless game player, a power failure on the gaming machine 2 and other factors. To continue an interrupted game, the wireless game player 725 may ping the gaming machine 2 to reestablish communications and start the verification and authentication cycle as previously described. In the case of a dispute, the player may have to return to the gaming machine 2 so that game history records on the gaming machine can be accessed.

Figure 9:
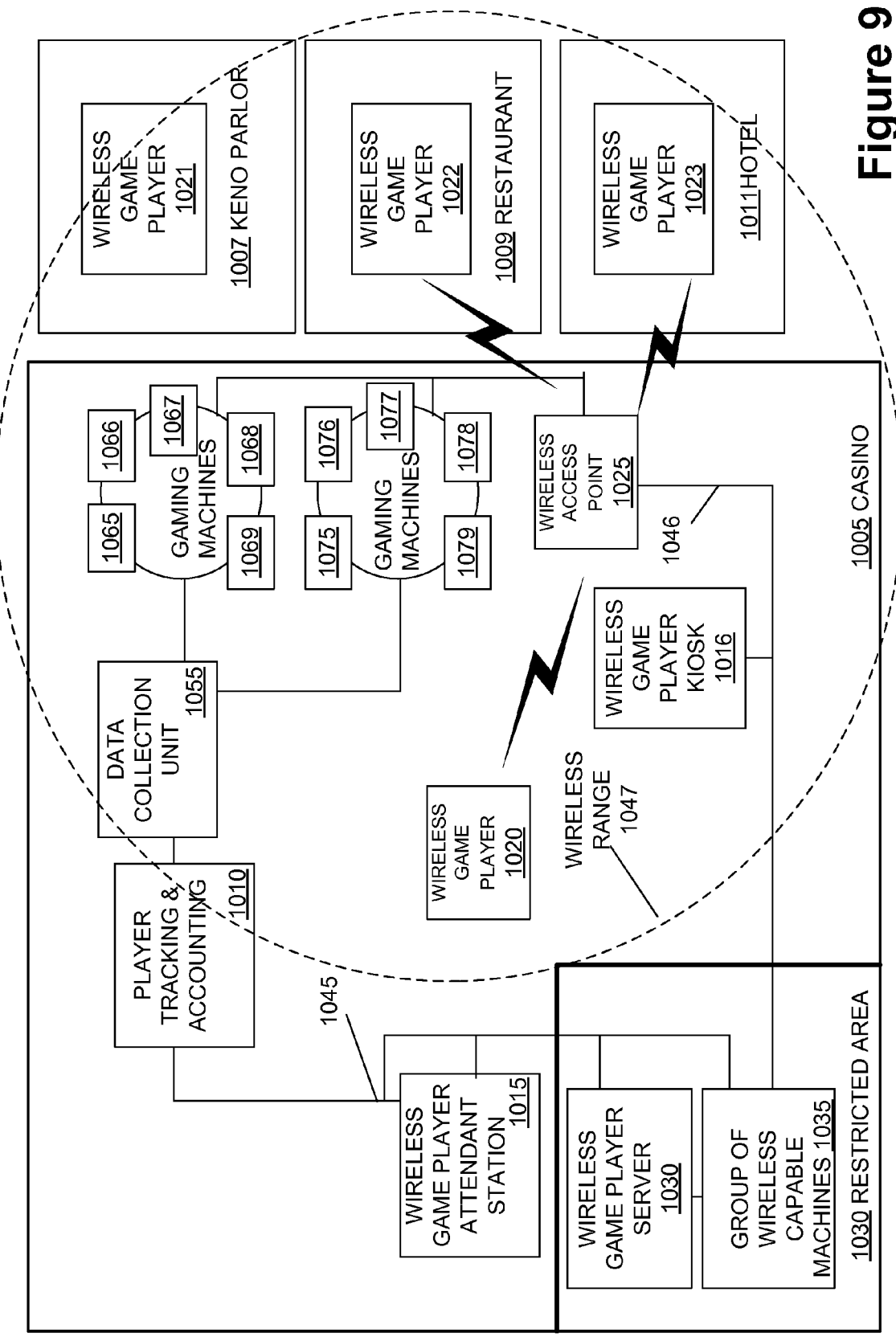
FIG. 9 is a block diagram of a network of gaming machines and wireless game players.

FIG. 9 is a block diagram of a network of gaming machines and wireless game players. Gaming machines 1065, 1066, 1067, 1068, 1069, 1075, 1076, 1077, 1078 and 1079, located in a floor area of casino 1005, support wireless game play and are connected to a wireless access point 1025. The gaming machines 1065, 1066, 1067, 1068, 1069, 1075, 1076, 1077, 1078 and 1079 are also connected to a player tracking system 1010 via a data collection unit 1055. Thus, game play on a wireless game player, such as 1020, in communication with one of the gaming machines on the casino floor may generate player tracking points. Further, a player using a game player, such as 1020, may be able to utilize services traditionally offered through player tracking devices on gaming machines such as a drink request. To provide the player tracking services, a player tracking service interface may be displayed on the touch screen of the wireless game player. Details of player tracking services and other gaming services that may be provided through a wireless game player of the present invention are described in U.S. Pat. No. 6,908,387, which is incorporated herein in its entirety and for all purposes.

The gaming machines located on the casino floor may also be connected to other remote servers such as but not limited to cashless system servers, progressive game servers, bonus game servers, prize servers, Internet, an entertainment content server, a concierge service server and a money transfer server and the like. Game services offered by the remote servers connected to the gaming machines may also be offered on wireless game players such as 1020. For instance, a game player may participate in a progressive game using the wireless game player 1020. In another example, a game player may be able to perform a cashless transaction enabled by a cashless system, such as the EZPAY™ cashless system (IGT, Reno Nev.), using a wireless game player.

In one embodiment, the gaming machines 1065, 1066, 1067, 1068, 1069, 1075, 1076, 1077, 1078 and 1079 connected to the access point 1025 are each provided with a wireless game player, such as 1020, 1021, 1022 and 1023. The gaming machines use a common wireless access point 1025. In this case, the access point device is also a multi-port switch. So, each machine has an Ethernet connection to the access point 1025.

In another embodiment of the present invention, an antenna may be built into a candle located on top of a gaming machine or some other location in the gaming machine. The antenna may be used as a wireless access point for wireless game play on one or more gaming machines. As an example, an antenna may be installed in the candle of gaming machine 1067 to be used as a wireless access point for wireless game play on gaming machines 1065, 1066, 1067, 1068 and 1069. A single gaming machine with an antenna may be used as part of a larger network of gaming devices providing wireless game play or may be used independently of a larger network. The antenna can, for example, be provided in accordance with the techniques described in the U.S. Pat. No. 5,605,506, entitled "CANDLE ANTENNA."

To obtain a wireless game player on one of the gaming machines on the casino floor, a player may request a wireless game player via a service call on the gaming machine such as through the player tracking system. The request may go to a remote location, such as a terminal at a wireless game player attendant station 1015 and an attendant may then bring a wireless game player to the gaming machine where the request for wireless game play has been made. The request may be routed to the attendant station 1015 via the wireless game player server 1030. When a wireless game player server 1030 is not used, the request may be sent directly to the attendant station 1015. As another example, when a request for wireless game play is made, a light on the gaming machine such as the candle on top of the gaming machine may be activated. In this case, a passing attendant may bring the game player a wireless game player. In yet another embodiment, a player may make a request for a wireless game player on a terminal at a wireless game player kiosk 1016.

Prior to enabling the network connection for the wireless game play, a person or a system program may determine the customer is eligible to use the wireless game player and verify their eligibility. For instance, most gaming jurisdictions include age eligibility rules which must be obeyed. As another example, eligibility to use a wireless game player may be based upon a player's value to a casino such as a status in a player tracking club. When authentication is required, the information is loaded from the system (could be a smart-card reader on the gaming machine) or a message appears on the gaming machine instructing the customer to provide information. For example, the gaming machines could have a fingerprint sensor located on the front panel or another biometric device. When required, the gaming machine could instruct the customer that it needs a fingerprint image or other biometric information before the customer may use the wireless game player. Information obtained through biometric sensors located on the gaming machine may be compared with information contained in a customer's biometric file. In some embodiments, the biometric information file may be downloaded to the gaming machine from a remote server and the biometric comparison may be performed on the gaming machine, the gaming machine may send biometric information to a remote server where the biometric comparison is performed, or combinations thereof.

In some instances, gaming machines supporting wireless game players may be located in a high-roller area (e.g., very valued customers) and the machines may have a specially designed stand where the wireless game players are stored. The wireless game players may be enabled by an attendant or may automatically be enabled when the casino customer inserts their player-tracking card into the gaming machine (special customer). As with the gaming machines located on the casino floor, the player-tracking system or some other remote gaming device may download the customer's biometric file to the gaming machine or the gaming machines could have a fingerprint sensor located on the front panel. When required, the gaming machine may instruct the customer that it needs a fingerprint image before the customer use the wireless game player.

To establish remote operations on the wireless game player, the gaming machine may ping the wireless game player with a series of communications. In one embodiment, once this operation is completed, the game play is transferred to the wireless game player. The screen of the gaming machines may go black (perhaps with a out-of-service message) and all customer cash and switch controls are locked out (nobody can use them). The master gaming controller on the gaming machine will continue to play the games, perform all the outcome determination and cash transaction (bets & credits), and maintains all the meter information. However, all the front panel and display data is channeled to the wireless game player. In one embodiment, when the gaming machines credit balance reaches zero, the customer is required to return to the gaming machine and insert more money. To enter more money, first, the local gaming machine controls are activated by the player or an attendant. In jurisdictions where the customer can use a debit or smart card to add money to a gaming machine, a card reader (smart card) connected to the wireless game player may be used to perform this function. In general, during a wireless game play session, the gaming machine communicates continuously with the wireless game player. In one embodiment, a web browser is used to display input switch commands. The displayed information on the wireless game player may come over from the gaming machine as HTML page information. Therefore, the wireless game player may use web-based transactions.

Additional details of a wireless game play network are described in the following paragraphs. The wireless game play network is shown in FIG. 9 is only one example of many possible embodiments of the present invention. The gaming machines and other gaming devices supporting wireless game play on wireless game players comprise a wireless game play network. The wireless game play network may be a part of a larger system network. The larger system network may provide the capability for a large number of gaming machines throughout a casino to be on the same wireless game play network. High-gain antennas and repeaters may be used to expand the range of the wireless game players allowing them to work in all areas of a casino/hotel complex, including hotels rooms and pool area. Racetracks, large bingo parlors and special outdoor events may also be covered within the wireless game play network allowing wireless game play in these areas.

The wireless game play network may also include wired access points that allow a wireless game player to be plugged directly into the network. For example, a wireless game player may include an Ethernet connector that may be directly plugged into the network segment 1046. The direct network connectors may be provided with cradles used to charge the wireless game player. The charging cradles may be located at many locations within the wireless game play network.

In FIG. 9, the range of the wireless access point 1025 is denoted by a circle 1047 used in the wireless game play network. Many such access points may be used in a wireless game play network depending upon the network topography. For instance, due the size of a particular casino and the area covered by a single access point, there could be other access points used as repeaters located throughout the casino and hotel. In addition, the wireless access point could also be connected to an existing network. After receiving an active wireless game player, a player may use the wireless game player in the areas of casino 1005 within the circle 1047. Further, the player may use the wireless game player, if approved by a local gaming jurisdiction, in the areas of a keno parlor 1007, a restaurant 1009, and a hotel 1011, which are within the circle 1047. While using the wireless game player, a player may wander to different locations within circle 1047 such as from the casino 1005 to the restaurant 1009.

In general, wireless game play in the wireless game play network is enabled by gaming devices executing licensed and regulated gaming software. However, the gaming devices supporting wireless game play are not limited gaming machines, such as 1065, 1066, 1067, 1068, 1069, 1075, 1076, 1077, 1078 and 1079 located on a casino floor. Special wireless-only gaming machines 1035 mounted in racks or containers connected to a wireless gaming network may be used to support wireless game play using wireless game players. The wireless-only gaming machines 1035 may not offer local game play. For instance, the wireless-only gaming machines 1035 may not include display screens. However, the wireless-only gaming machines are still regulated and licensed in a manner similar to traditional gaming machines. As another example, a wireless game player server 1030 with multiple processors may be used to support simultaneous game play on a plurality of wireless game players. The wireless-only gaming machines 1035 and the wireless game play server 1030 may be located in a restricted area 1030 of the casino 1005 and may not be generally accessible to game players.

The wireless-only gaming machines 1035 and wireless game play server 1030 are connected the wireless access point 1025 via a connection 1046. The wireless-only gaming machines 1035 and wireless game play server are also in communication with a wireless game player attendant station 1015 and the player tracking and accounting server 1010 via network connection 1045. The wireless-only gaming machine and wireless game player server 1030 may also be connected to other remote gaming devices such as a progressive servers, cashless system servers, bonus servers, prize servers and the like.

When using a wireless-only gaming machine, the customer may use a kiosk, such as 1016 or a cashier to enter cash and provide authentication information for a wireless game play session using a wireless game player. Then, the customer may be assigned a wireless game player, such as 1020, 1021, 1022 and 1023, in communication with one of the wireless-only gaming machines 1035 or the wireless game play server 1030. Once authenticated and verified, the customer may select a game and begin playing the wireless game player. There may be wireless game play cradles in the keno parlor 1022, restaurant 1009 or Sports Book areas, allowing the customer to play their favorite casino machine game and at the same time make keno or Sports Book bets or eat. In addition, the wireless game play cradles may be used to charge batteries on the wireless game player and may also be used to provide an additional network access point such as through a wire connection provided on the cradle. The wireless game player may also be used for Sports Book and Keno betting. Thus, a player may watch a horserace or see the results of a certain event on the display of the wireless game player.

Finally, the wireless game player may also be used for other activities besides gaming. For example, because of the authentication and verification (security) features, the wireless game player could be safe way to conduct monetary transactions such as electronic funds transfers. As another example, the wireless game player may be used for video teleconferencing to visually connect to a casino host or to provide instant messaging services. In addition, when the wireless game player supports web-based browsers and the wireless game play network includes Internet access, the wireless game player may be used to obtain any web-based services available over the Internet.

Figure 10:
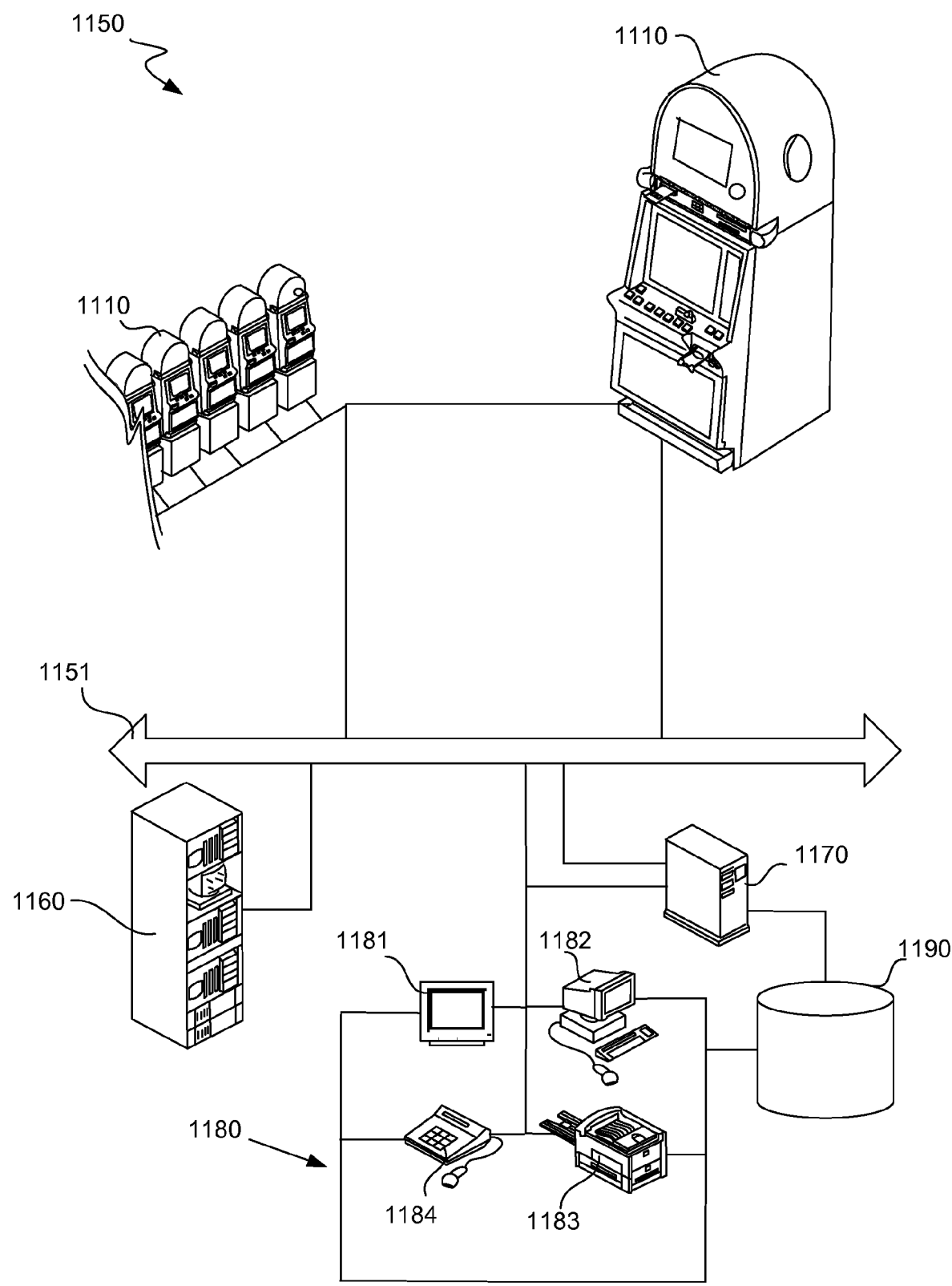
FIG. 10 illustrates in block diagram format an exemplary network infrastructure.

Referring now to FIG. 10, an exemplary network infrastructure for providing a gaming system having one or more gaming machines is illustrated in block diagram format. Exemplary gaming system 1150 has one or more gaming machines, various communication items, and a number of host-side components and devices adapted for use within a gaming environment. As shown, one or more gaming machines 1110 adapted for use in gaming system 1150 can be in a plurality of locations, such as in banks on a casino floor or standing alone at a smaller non-gaming establishment, as desired. Common bus 1151 can connect one or more gaming machines or devices to a number of networked devices on the gaming system 1150, such as, for example, a general-purpose server 1160, one or more special-purpose servers 1170, a sub-network of peripheral devices 1180, and/or a database 1190.

A general-purpose server 1160 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 1150 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 1150 can be isolated from any other network at the establishment, such that a general-purpose server 1160 is essentially impractical and unnecessary. Under either embodiment of an isolated or shared network, one or more of the special-purpose servers are preferably connected to sub-network 1180, which might be, for example, a cashier station or terminal. Peripheral devices in this sub-network may include, for example, one or more video displays 1181, one or more user terminals 1182, one or more printers 1183, and one or more other input devices 1184, such as a ticket validator or other security identifier, among others. Similarly, under either embodiment of an isolated or shared network, at least the specialized server 1170 or another similar component within a general-purpose server 1160 also preferably includes a connection to a database or other suitable storage medium 1190. Database 1190 is preferably adapted to store many or all files containing pertinent data or information regarding cashless instruments such as tickets, among other potential items. Files, data and other information on database 1190 can be stored for backup purposes, and are preferably accessible at one or more system locations, such as at a general-purpose server 1160, a special purpose server 1170 and/or a cashier station or other sub-network location 1180, as desired.

While gaming system 1150 can be a system that is specially designed and created new for use in a casino or gaming establishment, it is also possible that many items in this system can be taken or adopted from an existing gaming system. For example, gaming system 1150 could represent an existing cashless gaming system to which one or more of the inventive components or program modules are added. In addition to new hardware, new functionality via new software, modules, updates or otherwise can be provided to an existing database 1190, specialized server 1170 and/or general-purpose server 1160, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A gaming machine, comprising:
    a primary memory of the gaming machine operable to load
        a first gaming application program and a second gaming application program for execution by one or more processors, the first gaming application program and the gaming second application program being different application programs;

a non-volatile memory of the gaming machine configured to store the first gaming application program including one or more first gaming application program components and the second gaming application program including one or more second gaming application program components; and the one or more processors of the gaming machine configured to:

cause one or more first gaming application program components to load into the primary memory from the non-volatile memory so that the first gaming application program can be executed by the one or more processors, wherein each of the one or more first gaming application program components is associated with a different portion of the first gaming application, identify the second gaming application program that includes one or more second gaming application program components required to be loaded in the primary memory for execution of the second gaming application program by the one or more processors, wherein each of the one or more second gaming application program components is associated with a different portion of the second gaming application, determine whether each one of the one or more second gaming application program components of the second gaming application program are loaded in the primary memory by comparing the one or more first gaming application program components of the first gaming application program loaded in the primary memory with the one or more second gaming application program components of the second gaming application program so that the second gaming application program can be executed by the one or more processors, and cause at least one gaming application program component of the one or more second gaming application program components of the second gaming application program not to be loaded into the primary memory from the non-volatile memory when it is determined that the at least one gaming application program component is already loaded into the primary memory and consequently available for execution by the one or more processors.

2. A method for loading an application program stored in a nonvolatile memory of a gaming machine into a primary memory of the gaming machine for execution by the gaming machine operating in a gaming environment, comprising:

identifying the gaming application program that includes one or more gaming application program components required to be loaded in the primary memory for execution of the gaming application program by one or more processors of the gaming machine, wherein each of the one or more gaming application program components is associated with a different portion of the gaming application program;

determining whether each one of the one or more gaming application program components of the gaming application program are loaded in the primary memory so that the gaming application program can be executed by the one or more processors by comparing the one or more gaming application program components of the gaming application program with one or more another gaming application program components of an another gaming application program that was previously executed by the one or more processors, the gaming application program and the another gaming application program being different application programs; and not loading at least one gaming application program component of the one or more gaming application program components of the gaming application program into the primary memory from the non-volatile memory when the determining determines that the at least one gaming application program component is already loaded into the primary memory and consequently available for execution by the one or more processors.

3. The method of claim 2, wherein the determining of whether each one of the one or more gaming application components of the gaming application program are loaded in the primary memory includes determining whether the one or more gaming application program components of the gaming application program are stored in the primary memory as a result of loading the another gaming application program.

4. The method of claim 2, wherein the determining of whether each one of the one or more gaming application components of the gaming application program are loaded in the primary memory includes one or more of the following:

determining whether each one of the one or more gaming application program components have been loaded into the primary memory as a result of loading the gaming another application program;

determining whether each one of the one or more gaming application program components have been loaded into the primary memory as a result of a previous loading of the gaming application program; and determining whether each one of the one or more gaming application program components have been loaded into the primary memory as a result of another one or more gaming application programs being previously executed prior to execution of the gaming application program.

5. The method of claim 2, wherein the determining of whether each one of the one or more gaming application components of the gaming application program are loaded in the primary memory is performed based on differential application data that indicates whether one or more gaming application program components of the gaming application program is to be loaded in the primary memory for execution by the one or more processors.

6. The method of claim 5, wherein the differential application data identifies one or more gaming application program components of the gaming application program that have been already loaded in the primary memory as a result of execution of one or more other gaming application programs.

7. The method of claim 5, wherein the differential application data identifies one or more gaming application program components that the gaming application program has in common with another gaming application program that has been loaded in the primary memory.

8. The method of claim 5, wherein the differential application data identifies one or more gaming application components for unloading from the primary memory or overwriting in the primary memory.

9. The method of claim 5, wherein the differential application data describes the differences between the gaming application program and one or more other gaming applications programs with respect to their individual gaming application program components.

10. The method of claim 5, further comprising: determining the differential application data.

11. The method of claim 2, wherein the determining of whether each one of the one or more gaming application components of the gaming application program are loaded in the primary memory is performed based on differential application data that identifies one or more gaming application components of the gaming application program to be unloaded from the primary memory for execution by the one or more processors.

12. The method of claim 2, wherein the gaming application program pertains to a game.

13. The method of claim 12, wherein the game is a game of chance.

14. The method of claim 2, wherein the determining of whether each one of the one or more gaming application components of the gaming application program are loaded in the primary memory is performed at runtime during the execution of one or more other gaming application programs.

15. The method of claim 2, wherein the determining of whether each one of the one or more gaming application components of the gaming application program arc loaded in the primary memory includes comparing the one or more gaming application components with components of one or more other gaming application programs.

16. The method of claim 15, wherein the comparing is performed during the runtime of the one or more other gaming application programs.

17. The method of claim 15, further comprising:
generating differential application data based on the comparing of the one or more gaming application components with components of one or more other gaming application programs; and
storing the differential application data for subsequent execution.

18. A method for loading an application program stored in a non-volatile memory of a gaming machine into a primary memory of the gaming machine for execution by the gaming machine, wherein the gaming machine is operating in a gaming environment, comprising:
identifying the gaming application program that includes one or more gaming application program components required to be loaded in the primary memory for execution of the gaming application program by one or more microprocessors of the gaming machine, wherein each of the one or more gaming application program components is associated with a different portion of the gaming application program;
determining the difference between the one or more gaming application program components of the gaming application program and one or more another gaming application program components of an another gaming application program that previously executed or currently being executed by the one or more microprocessors to determine whether at least one of the one or more gaming application program components of the gaming application program need not be loaded into the primary memory for execution by the one or more microprocessors, the gaming application program and the another gaming application program being different gaming application programs;
not loading the at least one gaming application program component of the one or more gaming application program components of the gaming application program into the primary memory from the non-volatile memory when the determining determines not to load the at least one gaming application program component into the primary memory.

19. A method for executing a gaming application program stored in a non-volatile memory of a gaming machine and loaded into a primary memory of the gaming machine for execution by the gaming machine, comprising:
identifying the gaming application program for execution by the gaming machine, wherein the gaming application program includes a plurality of individual gaming application components, wherein each of the plurality of individual gaming application components is associated with a different portion of the gaming application, and wherein execution of the gaming application program requires that the plurality of individual gaming application components be loaded into the primary memory from the non-volatile memory;
determining, based on another gaming application program that was previously executed, differential application data that identifies one or more of the plurality of individual gaming application components of the gaming application program that are loaded into the primary memory as a result of execution of the another gaming application program, the another gaming application program and the gaming application program being different gaming application programs;
determining based on the differential application data whether at least one of the one or more individual gaming application components is loaded into the primary memory and consequently need not be loaded into the primary memory again in order to execute the gaming application program;
causing at least one individual gaming application component of the gaming application program not to be loaded into the primary memory when the determining determines that the at least one of the one or more individual gaming application component is already loaded into the primary memory; and
executing the gaming application program without loading the at least one individual gaming application component when the determining determines that the at least one individual gaming application program is loaded into the primary memory.

20. The method of claim 19, wherein the differential application data includes a loading counter that provides a current loading status for the plurality of individual gaming application components of the gaming application or an indication as to whether to load one or more of said plurality of individual gaming application components of the gaming application.

21. A gaming machine configured to provide multiple games for one or more players, comprising:
a primary memory operable to load a first gaming program and a second gaming program for execution by one or more processors of the gaming machine;
a non-volatile memory configured to store the first gaming program including one or more first gaming program components and the second gaming program including one or more second gaming program components, wherein each of the one or more first gaming program components is associated with a different portion of the first gaming program, wherein each of the one or more second gaming program components is associated with a different portion of the second gaming program, and wherein the first gaming program and the second gaming program are different gaming programs; and
the one or more processors configured to:
cause the one or more first gaming program components of the first gaming program to load into the primary memory from the non-volatile memory so that first gaming program can be executed by the one or more processors, identify the second gaming program for execution by the one or more processors, wherein execution of the second gaming program requires that the one or more second gaming components be stored into the primary memory for execution by the one or more processors, determine differential data indicating one or more of the first gaming program components that are stored in the primary memory to be used for execution by the one or more processors of the second gaming program, determine based on the differential data whether at least one of the one or more first gaming components that corresponds to at least one of the one or more second gaming components is loaded into the primary memory and consequently the at least one of the one or more second gaming components does not need to be loaded into the primary memory in order to execute the second gaming program, cause at least one second gaming program component of the second gaming program not to be loaded into the primary memory when the determining determines that at least one of the one or more first gaming components that corresponds to the at least one of the one or more second gaming program components is already loaded into the primary memory, and executing the second gaming program without loading the at least one second gaming component when the determining determines that at least one of the one or more first gaming components that corresponds to the at least one second gaming program component is loaded into the primary memory.

22. A gaming machine implemented method for executing multiple gaming application programs, comprising:

identifying, with one or more processors of the gaming machine, a gaming application program for execution, wherein execution of the gaming application program requires that one or more gaming application program components of the gaming application program be loaded in a primary memory of the gaming machine, wherein each of the one or more gaming application program components is associated with a different portion of the gaming application program;

determining with the one or more processors whether differential application data is available for the gaming application program, wherein the differential application data describes differences between the gaming application program components of the gaming application program and gaming application program components of another gaming application program that are known to be loaded in the primary memory, the gaming application program and the another gaming application program being different gaming application programs; and loading, based on the differential application data, the gaming application program into the primary memory when the determining determines that the differential application data is available; and executing with the one or more processors the gaming application program after the loading.

23. The gaming machine implemented method of claim 22, further comprising:

generating with the one or more processors differential application data that describes the differences between the gaming application program components of the gaming application and the gaming application program components that are known to be loaded in the primary memory.

24. The gaming machine implemented method of claim 23, further comprising:

generating with the one or more processors differential application data that describes the differences between the gaming application program components of the gaming application and the gaming application program components of the another gaming application program.

25. The gaming machine implemented method of claim 24, wherein the another gaming application program has been executed prior to execution of the gaming application program or the another gaming application program is to be executed concurrently with the gaming application program.

26. The gaming machine implemented method of claim 23, wherein the differential application data identifies the one or more gaming application program components of the gaming application program that are known to be loaded in the primary memory as a result of execution or loading of the another gaming application program that was previously executed or being currently executed, and further comprising not loading the one or more gaming application program components that are known to be loaded in the primary memory.

27. A gaming machine implemented method as recited in claim 22, wherein the differential application data identifies one or more gaming application program components of the gaming application program for loading into the primary memory.

28. The gaming machine implemented method of claim 22, further comprising:

determining whether it would be efficient to load the gaming application program selectively based on the differential application data when the determining determines that the differential application data is available; and loading all of the gaming application program components of the gaming application program when the determining determines that it would not be efficient to load the gaming application program selectively based on the differential application data.

29. The gaming machine implemented method of claim 22, wherein the gaming application program is packaged as a gaming application package, and wherein the loading of all of the gaming application components loads the gaming application package in its entirety.

30. A non-transitory computer readable medium including computer program code for loading an application program into a primary memory for execution by a gaming machine operating in a gaming environment, comprising:

computer program code for identifying the gaming application program that includes one or more gaming application program components required to be loaded in the primary memory for execution of the gaming application program, wherein each of the one or more gaming application program components is associated with a different portion of the gaming application program;

computer program code for determining whether each one of the one or more gaming application program components of the gaming application program are loaded in the primary memory so that the gaming application program can be executed by the gaming machine by comparing the one or more gaming application program components of the gaming application program with one or more another gaming application program components of an another gaming application program that was previously executed by the computing system, the gaming application program and the another gaming application program being different gaming application programs; and computer program code for not loading at least one gaming application program component of the one or more gaming application program components of the gaming application program into the primary memory when the determining determines that the at least one gaming application program component is loaded into the primary memory and consequently available for execution of the gaming application program.

31. A non-transitory computer readable medium including computer program code for providing multiple games on a gaming machine for play by one or more players, comprising:

computer program code for identifying a gaming program for execution by the gaming machine, wherein the gaming program includes a plurality of individual gaming components, wherein each of the plurality of individual gaming components is associated with a different portion of the gaming application, and wherein execution of the gaming program requires that the plurality of individual gaming components be loaded into a primary memory of the gaming machine for execution by the gaming machine;

computer program code for determining, based on another gaming program that was previously executed, differential data that can identify one or more of the plurality of individual gaming components of the gaming program which are loaded into the primary memory of the gaming machine as a result of execution of the another gaming program, the another gaming program and the gaming program being different gaming programs;

computer program code for determining based on the differential data whether at least one of the plurality of the individual gaming program components is loaded into the primary memory of the gaming machine; and computer program code for causing at least one individual gaming component of the gaming program not to be loaded into the primary memory of the gaming machine when the determining determines that the at least one individual gaming program component is already loaded into the primary memory, thereby allowing the gaming machine to execute the gaming program without reloading the at least one individual gaming program component into the primary memory.

* * * * *